(12) United States Patent
MacAulay

(10) Patent No.: US 7,755,832 B2
(45) Date of Patent: Jul. 13, 2010

(54) APPARATUS AND METHODS RELATING TO SPATIALLY LIGHT MODULATED MICROSCOPY

(75) Inventor: Calum E. MacAulay, Vancouver (CA)

(73) Assignee: Motic China Group Co., Ltd., Xiamen (CN)

( * ) Notice: Subject to any disclaimer, the term of this patent is extended or adjusted under 35 U.S.C. 154(b) by 0 days.

(21) Appl. No.: 12/194,513

(22) Filed: Aug. 19, 2008

(65) Prior Publication Data

US 2008/0316571 A1 Dec. 25, 2008

Related U.S. Application Data

(60) Continuation of application No. 11/499,086, filed on Aug. 4, 2006, which is a continuation of application No. 11/285,887, filed on Nov. 23, 2005, now abandoned, which is a continuation of application No. 10/260,004, filed on Oct. 25, 2001, now abandoned, which is a division of application No. 09/179,185, filed on Oct. 27, 1998, now Pat. No. 6,483,641.

(60) Provisional application No. 60/063,893, filed on Oct. 29, 1997.

(51) Int. Cl.
*G02B 21/06* (2006.01)
(52) U.S. Cl. ........................ 359/388; 359/385
(58) Field of Classification Search ................ 359/385, 359/388
See application file for complete search history.

(56) References Cited

U.S. PATENT DOCUMENTS

| | | | |
|---|---|---|---|
| 3,920,311 A | 11/1975 | Tsuda et al. | |
| 4,561,731 A | 12/1985 | Kley | |
| 4,802,748 A | 2/1989 | McCarthy et al. | |
| 4,806,776 A | 2/1989 | Kley | |
| 4,852,985 A | 8/1989 | Fujihara et al. | |
| 4,963,724 A | 10/1990 | Neumann | |
| 5,065,008 A | 11/1991 | Hakamata et al. | |
| 5,067,805 A | 11/1991 | Corle et al. | |

(Continued)

FOREIGN PATENT DOCUMENTS

DE 3108389 A 4/1982

(Continued)

OTHER PUBLICATIONS

Dlugan et al. "Update on the Use of Digital Micromirror Devices in Quantitative Microscopy" Soc. Photo-Optical Instr. Eng., Conf. (Jan. 23-29, 1999).

(Continued)

*Primary Examiner*—Joshua L Pritchett
(74) *Attorney, Agent, or Firm*—Joshua King; Graybeal Jackson LLP

(57) ABSTRACT

Apparatus and methods relating to microscopes having specific control of the light that contacts a sample and/or a light detector, such as the eye of the user, a charge couple device or a video camera. The improved control includes enhanced, selective control of the angle of illumination, quantity of light and location of light reaching the sample and/or detector. The microscopes comprise one or more spatial light modulators in the illumination and/or detection light path of the microscope at one or both of the conjugate image plane of the aperture diaphragm of the objective lens and the conjugate image plane of the sample.

9 Claims, 13 Drawing Sheets

U.S. PATENT DOCUMENTS

| | | |
|---|---|---|
| 5,099,363 A | 3/1992 | Lichtman |
| 5,112,125 A | 5/1992 | Neumann |
| 5,162,941 A | 11/1992 | Favro et al. |
| 5,179,276 A | 1/1993 | Hakamata |
| 5,218,195 A | 6/1993 | Hakamata |
| 5,239,178 A | 8/1993 | Derndinger et al. |
| 5,280,169 A | 1/1994 | Honey et al. |
| 5,299,053 A | 3/1994 | Kleinburg et al. |
| 5,459,323 A | 10/1995 | Morgan |
| 5,559,214 A | 9/1996 | Delecki et al. |
| 5,587,832 A | 12/1996 | Krause |
| 5,706,085 A | 1/1998 | Blossey et al. |
| 5,742,419 A | 4/1998 | Dickensheets et al. |
| 5,777,783 A | 7/1998 | Endou et al. |
| 5,812,269 A | 9/1998 | Svetkoff et al. |
| 5,822,055 A | 10/1998 | Tsai et al. |
| 5,866,430 A | 2/1999 | Grow |
| 5,867,251 A | 2/1999 | Webb |
| 5,887,009 A | 3/1999 | Mandella et al. |
| 5,900,949 A | 5/1999 | Sampas |
| 5,923,466 A | 7/1999 | Krause et al. |
| 6,243,197 B1 | 6/2001 | Schalz |
| 6,483,641 B1 | 11/2002 | MacAulay |
| 2004/0047030 A1* | 3/2004 | MacAulay ................ 359/368 |

FOREIGN PATENT DOCUMENTS

| | | |
|---|---|---|
| EP | 0482340 A | 4/1992 |
| EP | 0502752 A | 9/1992 |
| EP | 0833181 A1 | 4/1998 |
| EP | 0911667 A1 | 4/1999 |
| EP | 0916981 A1 | 5/1999 |
| JP | 3132612 A | 6/1991 |
| JP | 03134608 A | 6/1991 |
| WO | 9731282 | 8/1997 |
| WO | PCT/US97/22969 | 7/1998 |

OTHER PUBLICATIONS

Macaulay et al. "Use of Digital Micro Mirror Devices in Quantitative Microscopy" Soc. Photo-Optical Instr. Eng., 3260-27, pp. 201-207 (1998).

Liang et al. "Confocal Pattern Period in Multiple-Aperture Confocal Imaging Systems with Coherent Illumination" Optical Letters, vol. 22, No. 11 (1997).

European Patent Office, International Search Report, PCT Application No. PCT/CA1998/00993, Apr. 8, 1999.

* cited by examiner

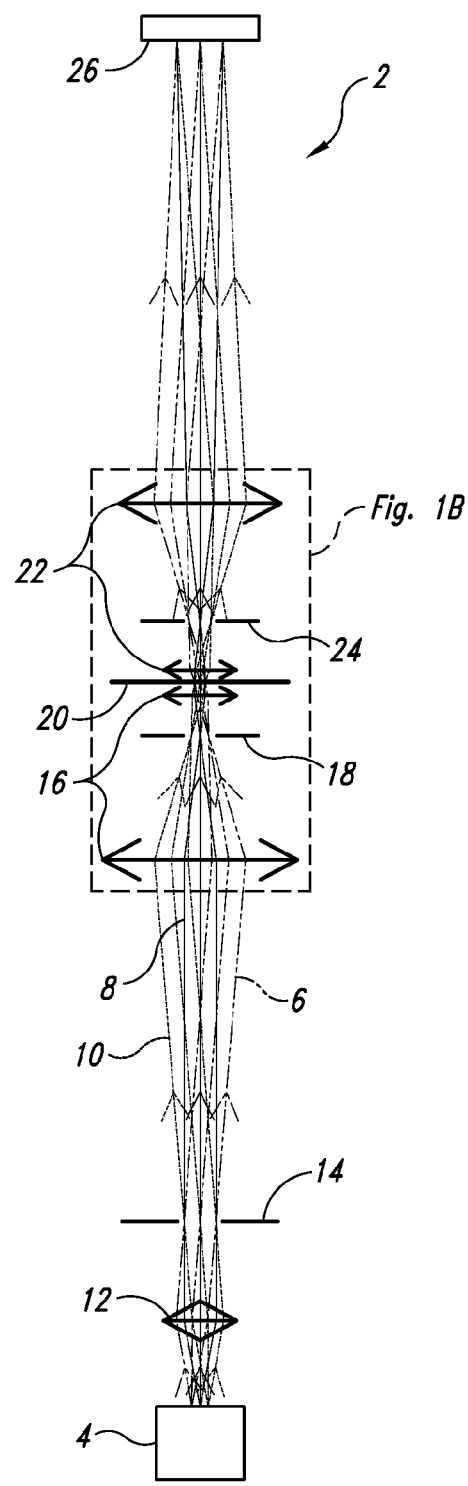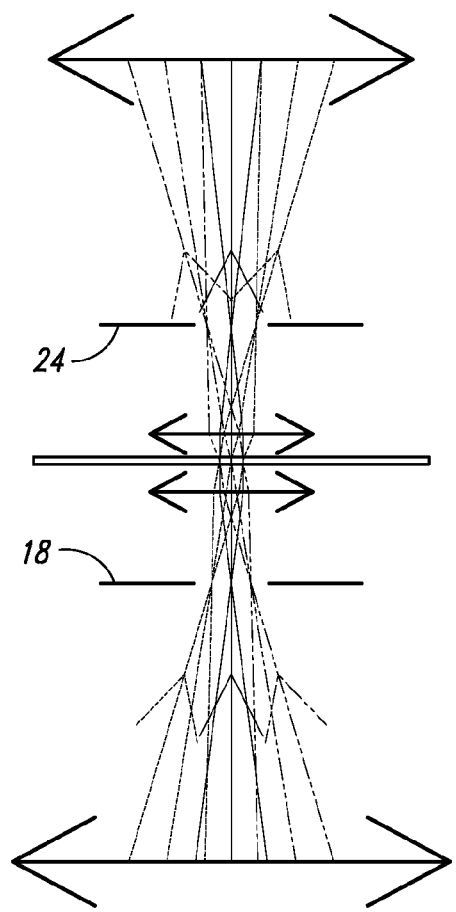
Fig. 1A
(Prior Art)
Fig. 1B
(Prior Art)

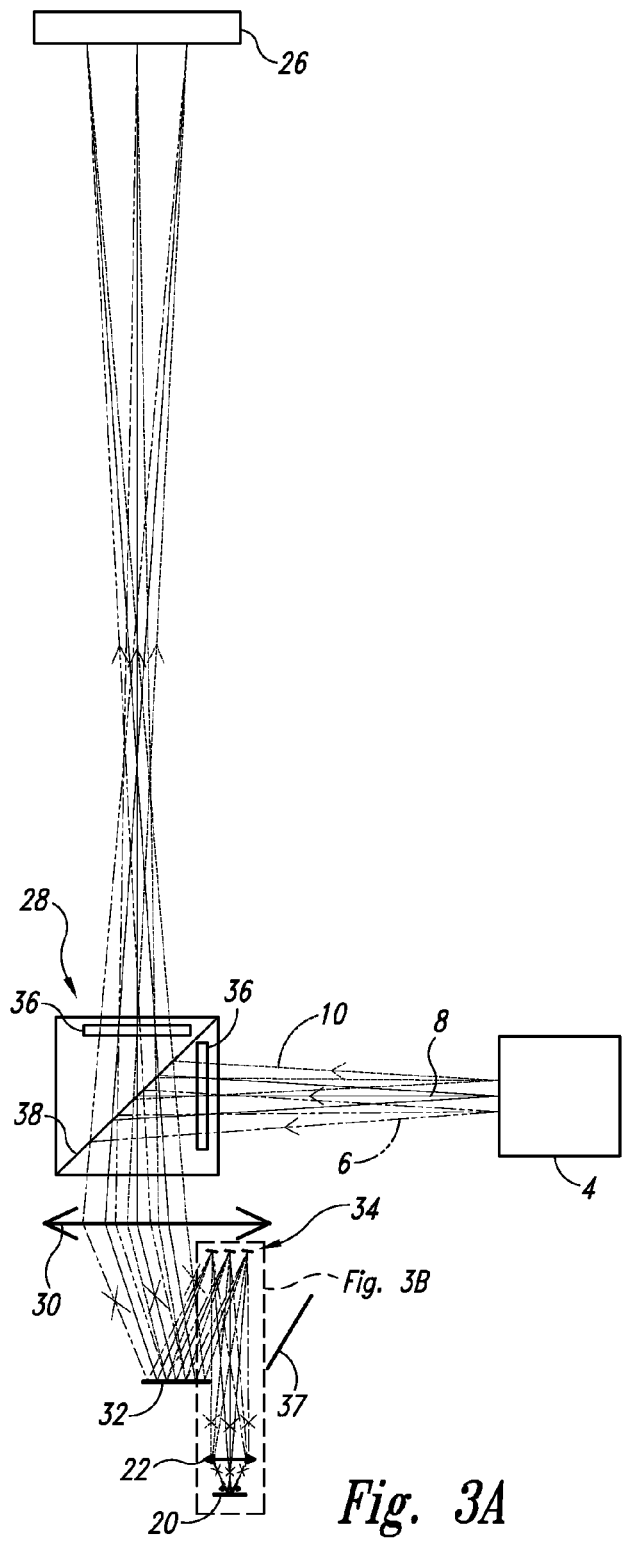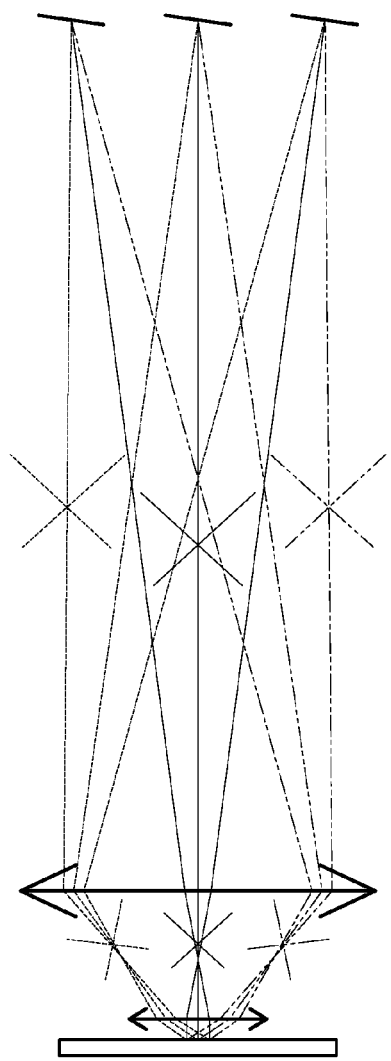
Fig. 3A
Fig. 3B

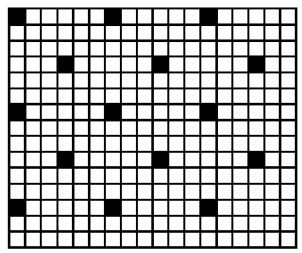
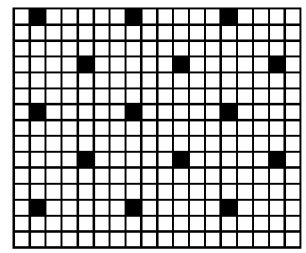
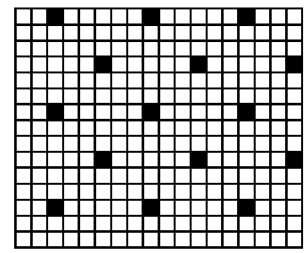
*Fig. 4A*     *Fig. 4B*     *Fig. 4C*
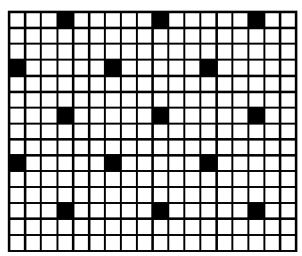
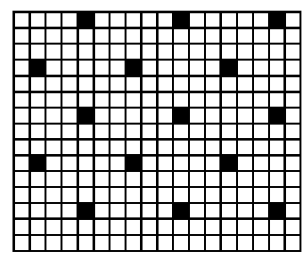
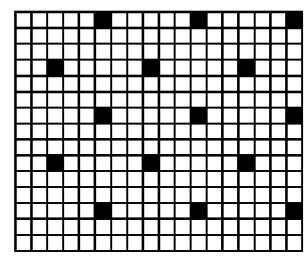
*Fig. 4D*     *Fig. 4E*     *Fig. 4F*
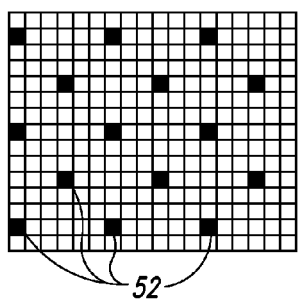
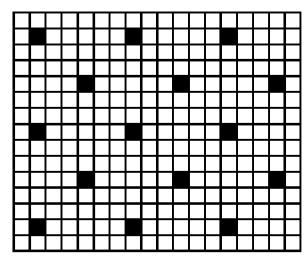
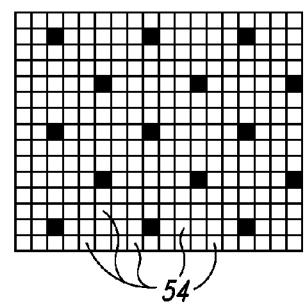
*Fig. 4G*     *Fig. 4H*     *Fig. 4I*

APPARATUS AND METHODS RELATING TO SPATIALLY LIGHT MODULATED MICROSCOPY

RELATED APPLICATIONS

This application claims the benefit of and is a continuation of co-pending U.S. patent application Ser. No. 11/499,086, filed Aug. 4, 2006; which application is a continuation of U.S. patent application Ser. No. 11/285,887, filed Nov. 23, 2005, now abandoned; which application is a continuation of U.S. patent application Ser. No. 10/260,004, filed Oct. 25, 2001, now abandoned; which application is a divisional of U.S. patent application Ser. No. 09/179,185, filed Oct. 27, 1998, now U.S. Pat. No. 6,483,641; which application claims the benefit of U.S. Provisional Patent Application Ser. No. 60/063,893, filed on Oct. 29, 1997, now expired, all of said applications being incorporated herein by reference in their entireties.

FIELD OF THE INVENTION

The field of the present invention is the magnification of images of objects, and more particularly microscopes and the field of microscopy.

BACKGROUND OF THE INVENTION

Microscopy is used to produce magnified representations of both dynamic and stationary objects or samples. There are many different modes of microscopy such as brightfield microscopy, darkfield microscopy, phase contrast microscopy, fluorescence microscopy, reflectance or reflected light microscopy and confocal microscopy. All of these forms of microscopy deliver illumination light in a controlled fashion to the sample and collect as much of the light containing the desired information about the sample as possible. Typically, this is accomplished using Kohler illumination in any of reflectance microscopy, transmission microscopy or epifluorescence microscopy. Both of these methods use appropriately placed diaphragms and lenses to control both the size of the numerical aperture (illumination cone) and the size of the illuminated area of the sample. In Kohler illumination, diaphragms are placed in at least two locations. First, a diaphragm is placed in the conjugate image plane of the sample, a location which permits control of the size of the illuminated area of the sample. Second, a diaphragm is placed in the conjugate image plane of the aperture diaphragm of the objective lens(es) (this location is also a conjugate image plane of the aperture diaphragm of the condenser lens(es)), a location which permits control of the angle(s) of the light illuminating the sample. Typically, any of the diaphragms can be a simple iris (for example, for brightfield microscopy and epillumination fluorescence microscopy), but the diaphragms can also be more complex (for example, in darkfield microscopy, where the diaphragms may comprise cutout rings of different diameters).

An example of a microscope using Kohler illumination is set forth in FIG. 1. In the figure, microscope 2 comprises a light source 4 that emits a plurality of light rays, which have been divided into first light rays 6, second light rays 8 and third light rays 10. The light rays are transmitted along an illumination light path 3 from light source 4 through light source lens 12, adjustable iris field diaphragm 14 and condensor lenses 16. An adjustable iris aperture diaphragm (condenser) 18 can be disposed between upstream and downstream condenser lenses 16. The light then contacts, or impinges upon, sample 20 and then proceeds to pass through objective lenses 22, which objective lenses can comprise an aperture diaphragm (objective) 24 spaced between the objective lenses 22, and then the light rays proceed to a light detector 26. As noted above, the angle of illumination of the sample can be controlled by modulating the light as it passes through conjugate image planes of the aperture diaphragm of the objective lens, which planes can be found, for example, at light source 4 and the upstream aperture diaphragm 18 in FIG. 1, while the location and/or area of illumination of the sample can be controlled by modulating light as it passes through a conjugate image plane of the sample, which plane corresponds to the adjustable iris field diaphragm 14 in FIG. 1.

One preferred form of microscopy is confocal microscopy, in which discreet aperture spots are illuminated in the object plane of the microscope from which transmission, reflected or fluorescent light is then relayed for observation through conjugate apertures in the image plane. In some embodiments, confocal microscopy can result in spatial resolution about 1.3 times better than the optimum resolution obtainable by conventional light microscopy. See, e.g., U.S. Pat. No. 5,587,832. Additionally, confocal microscopy can reduce the interference of stray, out-of-focus light from an observed specimen above or below the focal plane, and can permit optical sectioning of tissue as well as high-resolution 3-D reconstruction of the tissue. The technique can effectively resolve individual cells and living tissue without staining. Confocal microscopy can be performed using mechanical translation of the specimen with fixed optics, or using a fixed specimen and scanning beams manipulated by special rotating aperture disks. See, U.S. Pat. No. 4,802,748, U.S. Pat. No. 5,067,805, U.S. Pat. No. 5,099,363, U.S. Pat. No. 5,162,941. Such disks typically comprise a plurality of apertures, but only one aperture at a time is used for confocal scanning. Still other known confocal scanning systems have used a laser beam rastered with rotating mirrors to scan a specimen or a laser beam that scans a slit rather than a spot; such slit scanning increases imaging speed but slightly degrades resolution. See, U.S. Pat. No. 5,587,832.

Conventional confocal microscopes can be slow to acquire images for certain applications and become even slower as the scan line density increases and the aperture separation decreases. In addition, it is difficult to practically adjust the perimeters of the confocal microscope in commercial systems, and the signal to noise ratio (SNR) is sacrificed to increase the imaging rate. In addition, proper alignment of conventional confocal systems can be critical and difficult to maintain. In addition, laser-based systems are more expensive than white light systems, but such laser systems do not offer a selection of illumination wavelengths and can also lead to photo toxicity and rapid photo bleaching.

Thus, there has gone unmet a need for improved microscopy systems, including confocal microscopy systems, wherein the angle of illumination of a sample can be easily and rapidly controlled. There has also gone unmet a need for a microscope that can easily and rapidly control the quantity of light reaching the sample, including both varying the absolute quantity of light as well as the location on the sample upon which the quantity of light impinges. The present invention provides these and other advantages.

SUMMARY OF THE INVENTION

The present invention provides microscopes that have significant advantages in controlling the light that contacts a sample and/or that is detected emanating from a sample. The improved control includes enhanced, selective control of the angle of illumination, the quantity of light and the location of light reaching the sample and/or detector. The present invention provides these advantages by placing one or more spatial light modulators in the illumination and/or detection light path of the microscope at one or both of the conjugate image plane of the aperture diaphragm of the objective lens and the conjugate image plane of the sample.

Thus, in one aspect the present invention provides microscopes comprising a spatial light modulator comprising an illumination array of individual light transmission pixels, the spatial light modulator disposed in an illumination light path of the microscope at a conjugate image plane of an aperture diaphragm of an objective lens to provide an upstream spatial light modulator.

In some embodiments, the microscopes selectively control the angle of illumination of a sample and the angle of detection of light emanating from the sample, wherein the upstream spatial light modulator is operably connected to a modulator controller containing computer-implemented programming that controls transmissive characteristics of the spatial light modulator to select a desired angle of illumination and detection of the sample and wherein a selected portion of the individual light transmission pixels corresponding to the desired angle of illumination and detection is on. In other embodiments, the microscopes selectively control a quantity of light reaching a sample, the quantity being less than all the light emitted by a light source located at a beginning of the illumination light path, wherein the upstream spatial light modulator is operably connected to a modulator controller containing computer-implemented programming that controls transmissive characteristics of the spatial light modulator to select a desired quantity of illumination and a selected portion of the individual light transmission pixels corresponding to the desired quantity of illumination is on.

In further embodiments, the microscopes are transmission or reflectance microscopes. The microscopes can comprise a lens disposed in the illumination light path between a light source and the spatial light modulator, the light source disposed at a conjugate image plane of an aperture diaphragm of the objective lens that is located upstream from the upstream spatial light modulator. The microscopes can further comprise a second spatial light modulator that is disposed in a detection light path, located at a downstream conjugate image plane of an aperture diaphragm of the objective lens and operably connected to a second modulator controller containing computer-implemented programming that controls transmissive characteristics of the second spatial light modulator. Preferably, the first modulator controller is operably connected to the second modulator controller such that the second light modulator selectively controls the light in the detection light path to correspond to the desired angle selected by the first modulator controller; the various controllers discussed herein can be separate controllers or can be a single controller.

In still other embodiments, the microscopes provide darkfield microscopy, wherein the upstream spatial light modulator is operably connected to a first modulator controller containing computer-implemented programming that controls transmissive characteristics of the spatial light modulator to select a desired pattern for darkfield microscopy and a selected portion of the individual light transmission pixels corresponding to the desired pattern for darkfield microscopy is on, and a second spatial light modulator is disposed in a detection light path, located at a downstream conjugate image plane of an aperture diaphragm of the objective lens and operably connected to a second modulator controller containing computer-implemented programming that controls transmissive characteristics of the second spatial light modulator to select a complementary pattern of the individual light transmission pixels of the second spatial light modulator to complement the pattern of individual light transmission pixels of the first spatial light modulator that are on, thereby providing a complementary pattern of the individual light transmission pixels of the second spatial light modulator that are on.

In more embodiments, the microscopes alternate between darkfield microscopy and brightfield microscopy. This can be achieved, for example, wherein the first modulator controller and the second modulator controller control the transmissive characteristics of the first and second spatial light modulators to switch between brightfield microscopy and at least one desired pattern for darkfield microscopy. For this and other embodiments that comprise cycling or a method, the microscopes preferably perform the method or cycle, for example, to alternate back and forth between darkfield microscopy and brightfield microscopy, with a cycle or method time of less than the time that is needed for the detector, such as a human eye or video camera, to acquire an image, for example less than about 0.03 seconds, thereby providing real-time viewing if desired. In other preferred embodiments, the microscopes alternate back and forth between darkfield microscopy and brightfield microscopy without refocusing.

In still more embodiments for this other aspects of the present invention (unless expressly stated otherwise or clear from the context, all embodiments of the present invention can be mixed and matched), the microscopes comprise a light detector located at a downstream end of a detection light path, the light detector comprising a detection array of individual detection pixels. In come embodiments, the detection array of individual detection pixels corresponds to and is aligned with the illumination array of individual light transmission pixels in the upstream spatial light modulator and the detection array of individual detection pixels is operably connected to a detector controller and the illumination array of individual light transmission pixels in the spatial light modulator is connected to the modulator controller, such that the modulator controller contains computer-implemented programming that selects a plurality of desired angles of illumination of the sample and the detector controller contains computer-implemented programming that detects the changes in intensity in the detection array of individual detection pixels corresponding to the plurality of desired angles of illumination and detection and therefrom determines a three-dimensional image of the sample. In other embodiments, which can be combined with the previous embodiments, the modulator controller selects a plurality of desired angles of illumination of the sample to provide a plurality of images of the sample at a corresponding plurality of different depths within the sample and a reconstruction controller comprises computer-implemented programming that tomographically reconstructs the different images to provide a three dimensional image of the sample.

In more embodiments, the modulator controller selects the plurality of desired angles of illumination of the sample such that the plurality of images of the sample at a corresponding plurality of different depths are obtained without moving the sample, a condensor lens or an objective lens.

In other embodiments, the light detector is a charge-coupled device, charge-injection device, video camera and the microscopes can comprise one or more photomultiplier tubes and or ocular eyepieces located at a downstream end of the detection light path. The spatial light modulator can be, for example, a digital micromirror device, microshutter or a liquid crystal device.

In another aspect, the present invention provides microscopes comprising a variable field iris, the microscopes comprising a spatial light modulator comprising an illumination array of individual light transmission pixels and disposed in an illumination light path at a conjugate image plane of a sample, to provide an upstream spatial light modulator, and that is operably connected to a modulator controller containing computer-implemented programming that controls transmissive characteristics of the upstream spatial light modulator to select a plurality of desired field iris settings. In some embodiments for this and other aspects of the invention, the individual light transmission pixels of the illumination array are in the on/off status corresponding to the desired field iris setting.

In a further aspect, the present invention provides microscopes that project a selected image into an image plane of a sample of the microscope, the microscope comprising a spatial light modulator comprising an illumination array of individual light transmission pixels and disposed in a first illumination light path at a conjugate image plane of the sample, to provide a first upstream spatial light modulator, wherein the upstream spatial light modulator is operably connected to at least one controller containing computer-implemented programming that varies an on/off status of the individual light transmission pixels of the illumination array to correspond to the selected image, the microscope further comprising a second illumination light path that provides illumination light to the sample. The selected image can be projected onto the sample or adjacent to the sample or elsewhere if desired.

In certain embodiments, the upstream spatial light modulator is disposed in both the first illumination light path and the second illumination light path and a first portion of the individual light transmission pixels of the illumination array provides illumination light to the sample and second portion of the individual light transmission pixels of the illumination array are in an on/off status corresponding to the selected image.

In further embodiments, wherein the microscopes further comprise a light detector disposed downstream from the sample in a detection light path at a conjugate image plane of the sample, wherein the spatial light modulator and the light detector are operably connected to at least one controller containing computer-implemented programming that controls transmissive characteristics of the upstream spatial light modulator and that compiles the light intensity detection data provided by the light detector, the controller selectively varies the on/off status of individual light transmission pixels of the spatial light modulator to vary the light intensity impinging on selected spots of the sample and thereby vary the intensity of light emanating from the selected spots of the sample and impinging on at least one pixel of the light detector.

In a further aspect, the present invention provides microscopes that provide a uniform intensity of illumination light to a sample, the microscopes comprising a spatial light modulator comprising an illumination array of individual light transmission pixels and disposed in an illumination light path at a conjugate image plane of the sample, to provide an upstream spatial light modulator, and a light detector comprising a detection array of individual detection pixels and disposed downstream from the upstream spatial light modulator at a conjugate image plane of the sample and that receives light directly from the upstream spatial light modulator, wherein the spatial light modulator and the light detector are operably connected to at least one controller containing computer-implemented programming that controls transmissive characteristics of the upstream spatial light modulator and that compiles the light intensity detection data provided by the light detector, wherein the at least one controller selectively varies the on/off status of individual light transmission pixels of the spatial light modulator to compensate for non-uniform light intensities detected by the light detector, thereby providing a uniform intensity of illumination light that is transmitted to the sample.

In still another aspect, the present invention provides microscopes that vary the intensity of light emanating from a sample to a light detector, the microscopes comprising a spatial light modulator comprising an illumination array of individual light transmission pixels and disposed in an illumination light path at a conjugate image plane of the sample, to provide an upstream spatial light modulator, and the light detector which comprises a detection array of individual detection pixels and is disposed downstream from the sample in a detection light path at a conjugate image plane of the sample, wherein the spatial light modulator and the light detector are operably connected to at least one controller containing computer-implemented programming that controls transmissive characteristics of the upstream spatial light modulator and that compiles the light intensity detection data provided by the light detector, wherein the controller selectively varies the on/off status of individual light transmission pixels of the spatial light modulator to vary the light intensity impinging on selected spots of the sample and thereby vary the intensity of light emanating from the selected spots of the sample and impinging on at least one pixel of the light detector.

In various embodiments, the controller selectively varies the on/off status of individual light transmission pixels of the spatial light modulator such that when the light intensity impinging on a pixel of the light detector is greater than or equal to a threshold level that indicates that the light intensity significantly adversely affects adjacent pixels then at least one corresponding pixel in the upstream spatial light modulator is turned off for a time sufficient to reduce the light intensity impinging on the pixel of the light detector below the threshold level. In further embodiments, the controller selectively varies the on/off status of individual light transmission pixels of the spatial light modulator such the light intensity impinging on the detection array of pixels of the light detector is uniform across the detection array, and the controller determines the light intensity characteristics of the sample by determining an amount of time individual pixels in the illumination array of the upstream spatial light modulator are on or off.

In still further embodiments, the microscopes further comprise a second spatial light modulator that is disposed in the detection light path, located at a downstream conjugate image plane of a sample and operably connected to a second modulator controller containing computer-implemented programming that controls transmissive characteristics of the second spatial light modulator. In other embodiments, the microscopes can be a confocal microscope. For some embodiments, the detection array of individual detection pixels corresponds to and is aligned with the illumination array of individual light transmission pixels in the upstream spatial light modulator. The at least one controller contains computer-implemented programming that controls transmissive characteristics of the upstream spatial light modulator to provide at least one illumination spot to the sample by causing at least one individual light transmission pixel of the upstream spatial light modulator to be on while adjacent pixels are off and the detection array selectively detects the illumination spot. In preferred embodiments, the at least one controller causes the upstream spatial light modulator to simultaneously form a plurality of the illumination spots and to provide sequential complementary patterns of the spots.

In still other embodiments, the at least one controller causes the light detector to detect only light impinging on a central detection pixel aligned with and corresponding to an individual light transmission pixel of the upstream spatial light modulator that is on. The at least one controller can also cause the light detector to detect light impinging on a central detection pixel aligned with an individual light transmission pixel of the upstream spatial light modulator that is on and to detect light impinging on at least one detection pixel adjacent to the central detection pixel, and the controller contains computer-implemented programming that compiles the data provided by the at least one adjacent detection pixel and combines it with the data provided by the central detection pixel. In certain preferred embodiments the computer-implemented programming compiles the data provided by the adjacent detection pixels and combines it with the data provided by the central detection pixel such that the rejection of the out of focus information of the microscope is enhanced compared to the focus without the data from the adjacent detection pixels and/or compiles the data provided by the adjacent detection pixels and combines it with the data provided by the central detection pixel to determine the light absorption characteristics of the sample.

In still a further aspect, the present invention provides microscopes comprising a first spatial light modulator comprising a first illumination array of individual light transmission pixels, the first spatial light modulator disposed in an illumination light path at a conjugate image plane of an aperture diaphragm of an objective lens to provide a first upstream spatial light modulator and a second spatial light modulator comprising a second illumination array of individual light transmission pixels and disposed in the illumination light path at a conjugate image plane of a sample to provide a second upstream spatial light modulator. In further embodiments, the microscopes further comprise a third spatial light modulator disposed at the downstream conjugate image plane of an aperture diaphragm of the objective lens and/or a fourth spatial light modulator is disposed in the detection light path and located at the downstream conjugate image plane of a sample, as well as desired detectors and/or controllers.

In some embodiments, the microscopes provide confocal properties and selectively control the angle of illumination of a sample and the angle of detection of light emanating from the sample, wherein the computer-implemented programming that controls transmissive characteristics of the first spatial light modulator selects a desired angle of illumination and detection of the sample and wherein a selected portion of the individual light transmission pixels of the first spatial light modulator corresponding to the desired angle of illumination and detection is on and wherein the computer-implemented programming that controls transmissive characteristics of the second spatial light modulator provides at least one illumination spot to the sample by causing at least one individual light transmission pixel of the second spatial light modulator to be on while adjacent pixels are off and the detection pixels of the detection array are positioned to selectively detect the illumination spot.

In further embodiments, the computer-implemented programming causes the illumination array of individual light transmission pixels in the first spatial light modulator to provide a plurality of desired angles of illumination of the sample and the detection array of individual detection pixels to detect changes in intensity in the detection array of individual detection pixels corresponding to the plurality of desired angles of illumination and therefrom determining a three-dimensional image of the sample. The computer-implemented programming can also cause the illumination array of individual light transmission pixels in the first spatial light modulator to provide a plurality of desired angles of illumination of the sample to provide a plurality of images of the sample at a corresponding plurality of different depths within the sample and then tomographically reconstructs the different images to provide a three dimensional image of the sample. These embodiments are preferably effected without moving the sample, a condenser lens or an objective lens and can also selectively provide darkfield microscopy by causing the illumination array of individual light transmission pixels in the first spatial light modulator to provide a desired pattern for darkfield microscopy and a selected portion of the individual light transmission pixels corresponding to the desired pattern for darkfield microscopy is on and a complementary pattern of the individual light transmission pixels of the third spatial light modulator is on. The microscopes can alternate between darkfield microscopy and brightfield microscopy without refocusing.

In still further embodiments, the computer-implemented programming causes the light detector to detect only light impinging on a central detection pixel aligned with and corresponding to an individual light transmission pixel of the second spatial light modulator that is on, and can compile the data provided by the at least one adjacent detection pixel and combine it with the data provided by the central detection pixel. Thus the computer-implemented programming can compile the data provided by the adjacent detection pixels and combine it with the data provided by the central detection pixel such that the focus of the microscope is enhanced compared to the focus without the data from the adjacent detection pixels.

In yet further embodiments, the microscopes provide time-delayed fluorescence detection, wherein the computer-implemented programming causes at least one of the spatial light modulators to illuminate the sample for an amount of time suitable to induce fluorescence in the sample and then ceasing illuminating the sample, and then causing the detector to begin detecting fluorescence emanating from the sample.

In yet other aspects, the present invention provides microscopes comprising means for spatial light modulation disposed in an illumination light path at a conjugate image plane of an aperture diaphragm of an objective lens, which means for spatial light modulation can comprise means for selectively controlling a desired angle of illumination of a sample, wherein the means for spatial light modulation is operably connected to a computer means for controlling transmissive characteristics of the spatial light modulator for selecting the desired angle of illumination of the sample. The microscopes can comprise a variable field iris, the microscopes comprising means for spatial light modulation that is disposed in an illumination light path at a conjugate image plane of a sample, wherein the comprising means for spatial light modulation is operably connected to computer means for controlling transmissive characteristics of the spatial light modulator and for selecting a plurality of desired field iris settings.

In still yet other aspects, the present invention provides microscopes comprising that project a selected image into the image plane of a sample, the microscope comprising means for spatial light modulation that is disposed in an illumination light path at a conjugate image plane of the sample, wherein the means for spatial light modulation is operably connected to at least one computer means for controlling transmissive characteristics of the means for spatial light modulation and for projecting the selected image into the image plane of the sample, the microscope further comprising a second illumination light path that provides illumination light to the sample.

In other aspects, the present invention provides microscopes that provide a uniform intensity of illumination light to a sample, the microscope comprising means for spatial light modulation that is disposed in an illumination light path at a conjugate image plane of the sample, and means for detecting light that is disposed downstream from the means for spatial light modulation at a conjugate image plane of the sample and that receives light directly from the means for spatial light modulation, wherein the means for spatial light modulation and the means for detecting light are operably connected to at least one computer means for controlling transmissive characteristics of the means for spatial light modulation and that compiles the light intensity detection data provided by the means for detecting light, wherein the computer means selectively controls the transmissive characteristics of the means for spatial light modulation to compensate for non-uniform light intensities detected by the light detector, thereby providing a uniform intensity of illumination light that is transmitted to the sample.

In yet other aspects, the present invention provides microscopes that vary the intensity of light emanating from a sample to a means for detecting light, the microscope comprising means for spatial light modulation that is disposed in an illumination light path at a conjugate image plane of the sample and means for detecting light that is disposed downstream from the sample in a detection light path at a conjugate image plane of the sample, wherein the means for spatial light modulation and the means for detecting light are operably connected to at least one computer means for controlling transmissive characteristics of the means for spatial light modulation and that compiles the light intensity detection data provided by the means for detecting light, wherein the computer means selectively controls the transmissive characteristics of the means for spatial light modulation to vary the light intensity impinging on selected spots of the sample and thereby vary the intensity of light emanating from the selected spots of the sample and impinging on at least one pixel of the light detector.

In some embodiments, the computer means selectively varies the transmissive characteristics of the means for spatial light modulation such that when the light intensity impinging on a pixel of the means for detecting light is greater than or equal to a threshold level that indicates that the light intensity significantly adversely affects adjacent pixels then the transmissive characteristics of the means for spatial light modulation are varied for a time sufficient to reduce the light intensity impinging on the pixel of the means for detecting light below the threshold level. In other embodiments, the computer means selectively varies the transmissive characteristics of the means for spatial light modulation such that the light intensity impinging on the means for detecting light is uniform across the means for detecting light, and the computer means determines the light intensity characteristics of the sample by determining variation of the transmissive characteristics of the means for spatial light modulation. The microscopes can further comprise a second means for spatial light modulation that is disposed in the detection light path at a downstream conjugate image plane of a sample and is operably connected to a second computer means for controlling transmissive characteristics of the second means for spatial light modulation.

In still yet further aspects, the present invention provides microscopes comprising a first means for spatial light modulation that is disposed in an illumination light path at a conjugate image plane of an aperture diaphragm of an objective lens and a second means for spatial light modulation that is disposed in the illumination light path at a conjugate image plane of a sample. The microscopes can further comprise a third means for spatial light modulation is disposed at the downstream conjugate image plane of the aperture diaphragm of the objective lens, a fourth means for spatial light modulation is disposed in the detection light path and located at the downstream conjugate image plane of the sample, or means for detecting light located at a downstream end of the detection light path. All the means for spatial light modulation and the means for detecting light can be operably connected to at least one computer means for controlling the light transmissive or detection characteristics of the at least one means for spatial light modulation and the means for detecting light.

In still yet more aspects, the present invention provides methods of modulating an illumination light path within a microscope wherein the illumination light path comprises a spatial light modulator comprising an illumination array of individual light transmission pixels at a conjugate image plane of an aperture diaphragm of an objective lens, the method comprising modulating the illumination light path by selecting light transmissive characteristics of the spatial light modulator. The methods can further comprise transmitting light along the illumination light path such that the light passes the spatial light modulator and thereby modulating the light by the spatial light modulator.

In some embodiments, the methods further comprise selectively controlling an angle of illumination of a sample and an angle of detection of light emanating from the sample by turning on a selected portion of the individual light transmission pixels corresponding to the desired angle of illumination and detection. In other embodiments, the methods further comprise selectively controlling the quantity of light reaching a sample, the quantity being less than all the light emitted by a light source located at a beginning of the illumination light path, the methods comprise selecting a desired quantity of illumination by turning on a selected portion of the individual light transmission pixels corresponding to the desired quantity of illumination. In further embodiments, the methods further comprise darkfield microscopy and the methods further comprise: setting on a selected portion of the individual light transmission pixels of the illumination array corresponding to a desired pattern for darkfield microscopy, and setting on a selected portion of the second array corresponding to a complementary pattern that complement the desired pattern of the illumination array. The methods can further comprise alternating between darkfield microscopy and brightfield microscopy with or without refocusing.

In still some other embodiments, wherein the spatial light modulator is connected to a modulator controller containing computer-implemented programming that controls transmissive characteristics of the spatial light modulator and the microscope further comprises a light detector comprising a detection array of individual detection pixels and located at a downstream end of a detection light path, wherein the light detector is operably connected to a detector controller containing computer-implemented programming that controls detection characteristics of the detection array, and the methods further comprise: selecting a plurality of desired angles of illumination of the sample, and detecting the changes in intensity in the detection array corresponding to the plurality of desired angles of illumination, and therefrom determining a three-dimensional image of the sample. Alternatively, the methods can further comprise: selecting a plurality of desired angles of illumination of the sample to provide a plurality of images of the sample at a corresponding plurality of different depths within the sample, and tomographically reconstructing the different images to provide a three dimensional image of the sample. Preferably, the selecting and the reconstructing are performed without moving the sample, a condenser lens or an objective lens.

In still yet further aspects, the present invention provides methods for varying a field iris in a microscope wherein the microscope comprises a spatial light modulator comprising an illumination array of individual light transmission pixels and disposed in an illumination light path at a conjugate image plane of a sample, wherein the spatial light modulator is operably connected to a modulator controller containing computer-implemented programming that controls transmissive characteristics of the spatial light modulator, the methods comprising: selecting a desired field iris setting by setting the individual light transmission pixels of the illumination array to an on/off status corresponding to the desired field iris setting, and then changing the individual light transmission pixels of the illumination array to a different on/off status corresponding to a different desired field iris setting, thereby varying the field iris.

In still more aspects, the present invention provides methods of projecting a selected image into an image plane of a sample of a microscope, the microscope comprising a spatial light modulator comprising an illumination array of individual light transmission pixels and disposed in a first illumination light path at a conjugate image plane of the sample, to provide a first spatial light modulator, wherein the first spatial light modulator is operably connected to at least one controller containing computer-implemented programming that varies an on/off status of the individual light transmission pixels of the illumination array to correspond to the selected image, the microscope further Comprising a second illumination light path that provides illumination light to the sample, the method comprising: setting the individual light transmission pixels to an on/off status corresponding to the selected image, and projecting light onto the spatial light modulator such that the light passed by the spatial light modulator along the illumination light path to the image plane of the sample conveys the selected image. The methods can further comprise projecting the selected image onto the sample or adjacent to the sample.

In other embodiments, wherein the microscope further comprises a light detector comprising a detection array, the methods further comprise: selectively varying the on/off status of individual light transmission pixels of the spatial light modulator to vary the light intensity impinging on selected spots of the sample and thereby vary the intensity of light emanating from the selected spots of the sample and impinging on at least one pixel of the light detector.

In still other aspects, the present invention provides methods for providing uniform intensity of illumination light to a sample in a microscope, wherein the microscope comprises a spatial light modulator comprising an illumination array of individual light transmission pixels and disposed in an illumination light path at a conjugate image plane of a sample and a light detector comprising a detection array of individual detection pixels and disposed downstream from the upstream spatial light modulator at a conjugate image plane of the sample and that receives light directly from the upstream spatial light modulator, wherein the spatial light modulator and the light detector are operably connected to at least one controller containing computer-implemented programming that controls transmissive characteristics of the upstream spatial light modulator and that compiles the light intensity detection data provided by the light detector, the methods comprising: varying the on/off status of individual light transmission pixels of the spatial light modulator to compensate for non-uniform light intensities detected by the light detector, thereby providing a uniform intensity of illumination light that is transmitted to the sample.

In still more other aspects, the present invention provides methods for varying the intensity of light emanating from a sample to a light detector in a microscope, wherein the microscope comprises a spatial light modulator comprising an illumination array of individual light transmission pixels and disposed in an illumination light path at a conjugate image plane of the sample and a light detector that comprises a detection array of individual detection pixels and is disposed downstream from the sample in a detection light path at a conjugate image plane of the sample, wherein the spatial light modulator and the light detector are operably connected to at least one controller containing computer-implemented programming that controls transmissive characteristics of the spatial light modulator and that compiles the light intensity detection data provided by the light detector, the methods comprising: varying an on/off status of individual light transmission pixels of the spatial light modulator to vary the light intensity impinging on selected spots of the sample and thereby varying the intensity of light emanating from the selected spots of the sample and impinging on at least one pixel of the light detector. In some embodiments, the methods can further comprise selectively varying the on/off status of individual light transmission pixels of the spatial light modulator such that when the light intensity impinging on a pixel of the light detector is greater than or equal to a threshold level that indicates that the light intensity significantly adversely affects adjacent pixels then turning off at least one corresponding pixel in the spatial light modulator for a time sufficient to reduce the light intensity impinging on the pixel of the light detector below the threshold level. The methods can also comprise selectively varying the on/off status of individual light transmission pixels of the spatial light modulator such the light intensity impinging on the detection array of pixels of the light detector is uniform across the detection array, and determining the light intensity characteristics of the sample by determining an amount of time individual pixels in the illumination array of the upstream spatial light modulator are on or off.

In still some other embodiments, wherein the microscope is a confocal microscope, the methods further comprise providing at least one illumination spot to the sample by causing at least one individual light transmission pixel of the spatial light modulator to be on while adjacent pixels are off and then the detection array selectively detects the illumination spot. Preferably, the spatial light modulator simultaneously forms a plurality of the illumination spots and provides sequential complementary patterns of the spots. In other embodiments, the methods further comprise detecting light impinging on a central detection pixel aligned with an individual light transmission pixel of the spatial light modulator that is on and detecting light impinging on at least one detection pixel adjacent to the central detection pixel, and compiling the data provided by the at least one adjacent detection pixel and combining it with the data provided by the central detection pixel. The methods can further comprise compiling the data provided by the adjacent detection pixels and combining it with the data provided by the central detection pixel such that the rejection of the out of focus information of the microscope is enhanced compared to the focus without the data from the adjacent detection pixels, or the methods can comprise compiling the data provided by the adjacent detection pixels and combining it with the data provided by the central detection pixel and therefrom determining the light absorption characteristics of the sample.

In some embodiments, the methods provide real time directly viewable confocal microscopy.

In other aspects, the present invention provides methods of confocal microscopy comprising use of a microscope comprising a first spatial light modulator comprising a first illumination array of individual light transmission pixels, the first spatial light modulator disposed in an illumination light path at a conjugate image plane of an aperture diaphragm of an objective lens to provide a first upstream spatial light modulator, a second spatial light modulator comprising a second illumination array of individual light transmission pixels and disposed in the illumination light path at a conjugate image plane of a sample to provide a second upstream spatial light modulator, and a light detector located at a downstream end of the detection light path, the light detector comprising a detection array of individual detection pixels, wherein the spatial light modulators and the light detector are operably connected to at least one controller containing computer-implemented programming that controls the light transmissive or detection characteristics of the spatial light modulators and the light detector, wherein the methods comprise: selecting a desired angle of illumination and detection by turning on a selected portion of the individual light transmission pixels of the first illumination array corresponding to the desired angle of illumination and detection, and selecting a desired illumination spot by turning on a selected portion of the individual light transmission pixels of the second illumination array corresponding to the desired illumination spot such at least one individual light transmission pixel of the second illumination array is on while adjacent pixels are off and the detection pixels of the detection array are positioned to selectively detect the illumination spot. Such methods can further provide 3-D imaging, with or without moving the sample, a condenser lens or an objective lens.

In more aspects, the present invention the methods comprise time-delayed fluorescence detection, the methods comprising: illuminating the sample for an amount of time suitable to induce fluorescence in the sample, ceasing illuminating the sample, and then detecting fluorescence emanating from the sample.

These and other aspects of the present invention will become evident upon reference to the following Detailed Description and attached drawings. In addition, various references are set forth herein that describe in more detail certain apparatus and methods (e.g., spatial light modulators, etc.); all such references are incorporated herein by reference in their entirety.

BRIEF DESCRIPTION OF THE DRAWINGS

FIG. 1 provides a schematic view and an expanded schematic view of a conventional transmission light microscope using Kohler illumination.

FIG. 2A provides a detailed schematic plan view of a spatial light modulator that is a digital micromirror device.

FIG. 3 provides a schematic view and an expanded schematic view of a microscope according to one embodiment of the present invention that comprises a spatial light modulator to replace the field diaphragm.

FIG. 4A-4I show a partial scanning sequence of an object using a spatial light modulator with sequential complementary patterns of a plurality of illumination spots.

DETAILED DESCRIPTION OF THE INVENTION

Figure 2A:
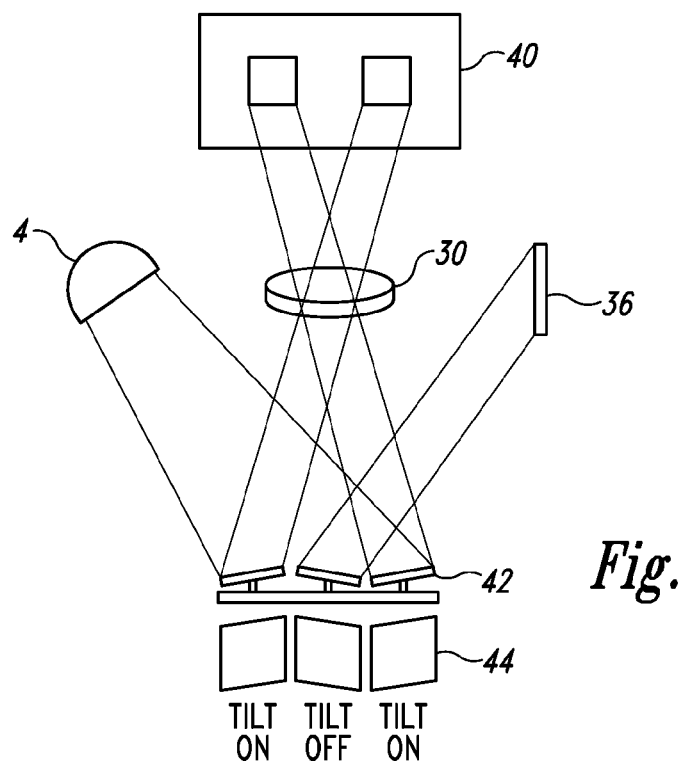
FIG. 2A provides a schematic view of a digital micromirror device as used in the apparatus and methods of the present invention.

The present invention provides microscopes that have significant advantages in controlling the light that contacts the sample. The microscopes also have advantages with regard to the controlling the light that contacts a light detector, such as the eye of the user or a video camera. The improved control includes enhanced, selective control of the angle of illumination, quantity of light and location of light reaching the sample and/or detector, such that the light reaching the sample comprises one or more desired characteristics. The present invention provides these advantages by placing one or more spatial light modulators in the illumination and/or detection light path of the microscope at one or both of the conjugate image plane of the aperture diaphragm of the objective lens and the conjugate image plane of the sample.

DEFINITIONS

A "spatial light modulator" (SLM) is a device that is able to selectively modulate light. In the present invention, spatial light modulators are disposed in the light path of a microscope. Typically, the spatial light modulator comprises an array of individual light transmission pixels, which are a plurality of spots that have transmissive characteristics such that they either transmit or pass the light along the light path or block the light and prevent it from continuing along the light path (for example, by absorbing the light or by reflecting it out of the light path). Such pixelated arrays are well known in the art, having also been referred to as a multiple pattern aperture array, and can be formed by an array of ferroelectric liquid crystal devices, by a digital micromirror device, or by electrostatic microshutters. See, U.S. Pat. No. 5,587,832; R. Vuelleumier, Novel Electromechanical Microshutter Display Device, Proc. Eurodisplay '84, Display Research Conference September 1984. Digital micromirror devices can be obtained from Texas Instruments, Inc., Dallas, Tex., U.S.A.

The "illumination light path" is the light path from a light source to a sample, while a "detection light path" is the light path for light emanating a sample to a detector. Light emanating from a sample includes light that reflects from a sample, is transmitted through a sample, or is created within the sample, for example, fluorescent light that is created within a sample pursuant to excitation with an appropriate wavelength of light (typically UV or blue light).

A "conjugate image plane of an aperture diaphragm of the objective lens" is a plane in either the illumination or detection light path where an image of the aperture diaphragm of the objective lens is recreated. Typically, this image plane also contains a recreation of the image of the light source, which in the present invention can be any light source such as a white light, an arc lamp or a laser. The conjugate image planes of the aperture diaphragm of the objective lens define locations that control the angle of illumination light that is ultimately impinged on a sample, as well as the angle of detection light that emanates from a sample (the "angle of illumination" and "angle of detection" refer to the angle of the light that is either impinging upon or emanating from a sample).

A "conjugate image plane of the sample" is a plane in either the illumination light path or the detection light path wherein image of the sample is recreated. The light detector(s) is typically located in one such site in the detection light path. The conjugate image planes of the sample defines locations that can control the size and location of spots on the sample that are illuminated and/or detected (depending upon whether the conjugate plane is in the illumination light path or the detection light path). The image plane of the sample is the plane wherein the sample is located, although the image plane of the sample can be greater or smaller than the size of the actual sample if either a plurality of light paths are provided or if the illumination area is greater or smaller than the size of the sample.

A "controller" is a device that is capable of controlling a spatial light modulator, a detector or other elements of the apparatus and methods of the present invention. For example, the controller can control the transmissive characteristics of the pixels in a spatial light modulator, control the on/off status of pixels of a pixelated light detector (such as a charge coupled device (CCD) or charge injection device (CID)), and/or compile data obtained from the detector, including using such data to make or reconstruct images or as feedback to control an upstream spatial light modulator. Typically, a controller is a computer or other device comprising a central processing unit (CPU). Controllers are well known in the art and selection of a desirable controller for a particular aspect of the present invention is within the scope of the art in view of the present disclosure.

"Upstream" and "downstream" are used in their traditional sense wherein upstream indicates that a given device is closer to a light source, while downstream indicates that a given object is farther away from a light source.

The terms set forth in this application are not to be interpreted in the claims as indicating a "means plus function" relationship unless the word "means" is specifically recited in the claims. This is also true of the term "step" for process or method claims.

Other terms and phrases in this application are defined in accordance with the above definitions, and in other portions of this application.

THE FIGURES

Turning to the figures, FIG. 1 depicts a prior art Kohler illumination-type microscope, and was discussed above.

FIG. 2A depicts a schematic view of a spatial light modulator, in this instance a digital micromirror device, in use in a microscope in accordance with the present invention. In FIG. 2A, light source 4 directs light onto micromirrors 42 of a digital micromirror device, which micromirrors are shown in both side view and top view. When a micromirror is in the "on" position, the light from light source 4 is reflected along an illumination light path 3, through projection lens 30 and into image plane 40. When a particular micromirror, which is an individual light transmission pixel, is in the "off" position, then the light from light source 4 is reflected to a beam stop 37. Thus, the on/off status of the individual light transmission pixels is established by whether or not the pixel is transmitting light along the desired light path. The on/off status of the pixels is capable of changing or alternating very rapidly. For example, in a digital micromirror device, the mirrors cycle from on to off to on (or vice-versa) in less time that can be observed by the human eye, for example, less than about 0.3 seconds, and even as fast as about 20 microseconds.

Figure 2B:
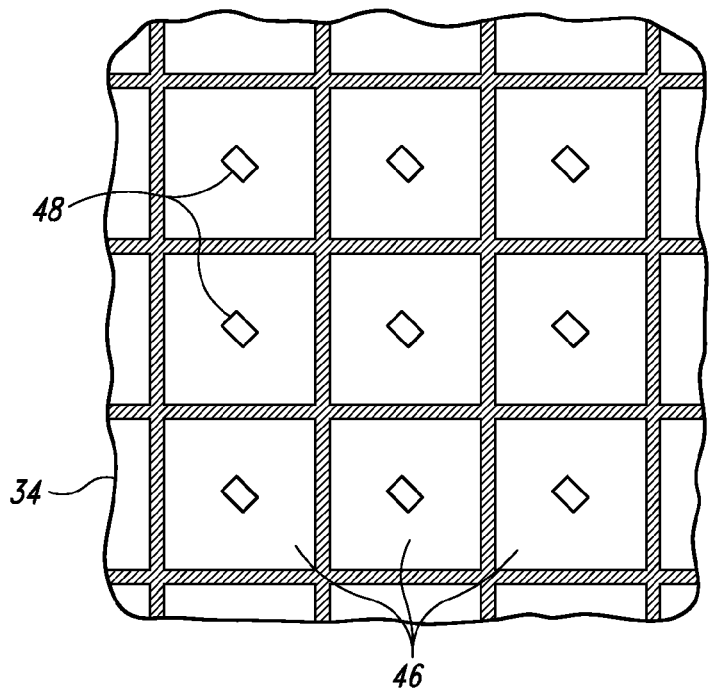
FIG. 2C provides a schematic view of a digital micromirror device transmitting light as different functions of time.

FIG. 2B depicts a detailed schematic plan view of a digital micromirror device 34 wherein individual micromirrors 46 are disposed atop mirror posts 48. In the embodiment depicted, there is an approximately 1 μm gap between the mirrors, and the mirrors are about 16 μm by 16 μm. Other shapes and sizes of mirrors are also possible.

Figure 2C:
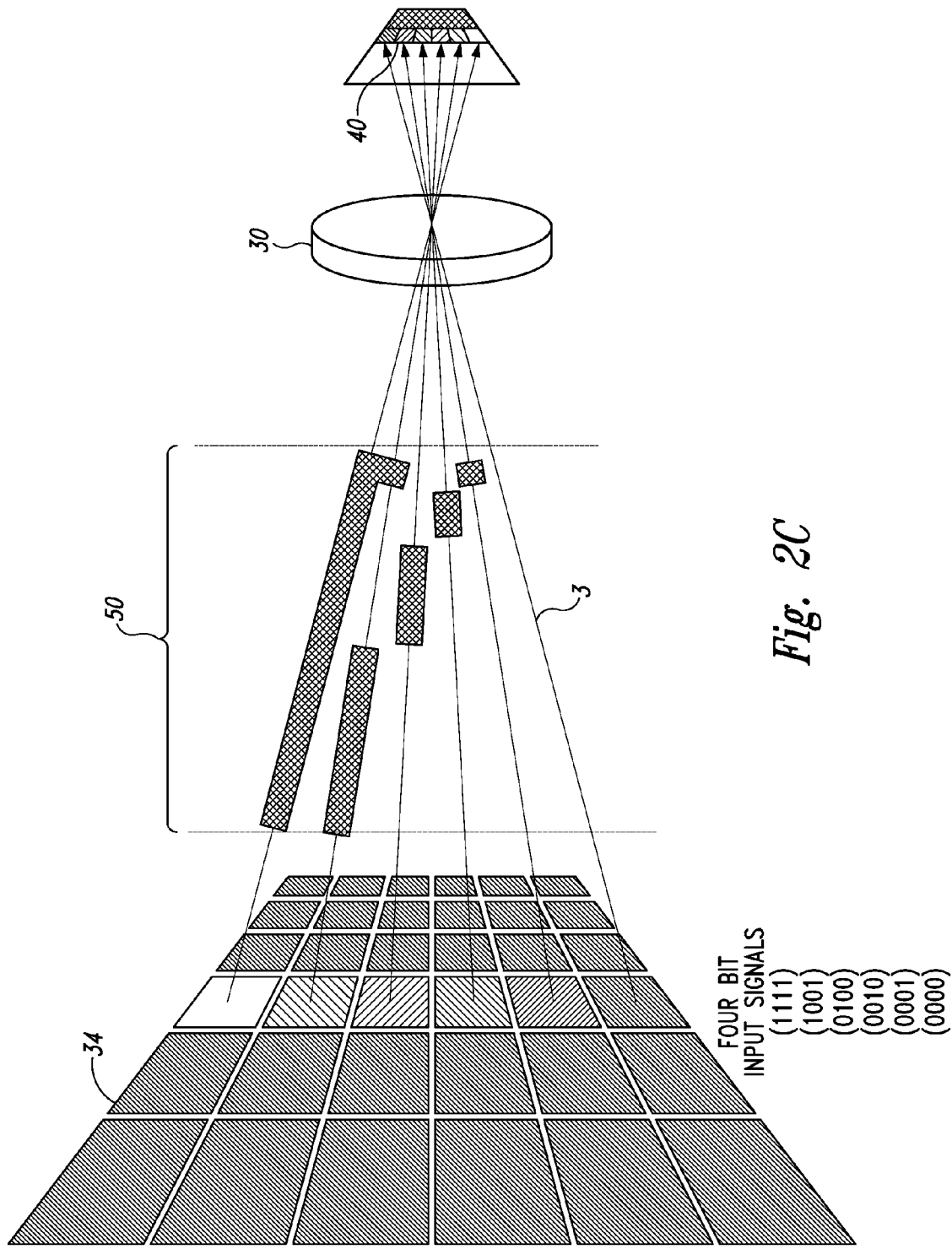

FIG. 2C depicts a schematic representation of a spatial light modulator of the present invention in use. In particular, digital micromirror device 34 reflects a plurality of light beams along illumination path 3 to projection lens 30 and into image plane 40. In a central column of the digital micromirror device 34, each of the digital micromirrors has a different percentage of time in which the mirror is on instead of off. For example, the top most micromirror in the figure is on 100% of the time, while the bottom most micromirror in the column in the figure is off 100% of the time, while the four mirrors between the two have an on/off status that is between 100% on and 100% off. Thus, each of the light rays from the central column have a different video field time 50, which video field time corresponds to the amount of on and off time for the particular micromirror.

FIG. 3 depicts a schematic drawing of a microscope according to the present invention having a spatial light modulator in an upstream conjugate image plane of the sample. Such a microscope is one of the embodiments herein that permits dynamic illumination control. Light source 4 emits first light rays 6, second light rays 8 and third light rays 10 along illumination light path 3 toward the sample 20. The light rays first pass through a filter 36, then reflect off a dichroic mirror 38 (the dichroic mirror 38 and filter 36 are maintained in a dichroic mirror and filter block set 28) and through a projection lens 30, followed by reflection off a simple mirror 32 onto a spatial light modulator, which in the figure is a digital micromirror device 34. As depicted in the figure, all of the individual light transmission pixels (i.e., micromirrors in the figure) are on, and thus all of light rays 6, 8, 10 are transmitted to objective lens set 22 and sample 20. The light is then reflected off the sample back through objective lens 22, off digital micromirror device 34 and simple mirror 32 and then transmitted through projection lens 30. The light then continues past dichroic mirror 38, filter 36 and ultimately to light detector 26. The light is transmitted from the sample to the light detector 26 along detection light path 5. In FIG. 3, digital micromirror device 34 is placed in a conjugate image plane of the sample in each of the illumination light path 3 and the detection light path 5. Thus, a single digital micromirror device functions as both a first spatial light modulator and a second spatial light modulator, one which is upstream from the sample and one of which is downstream from the sample. Light detector 26 can be any light detector as is well known in the art, for example, a charged coupled device (CCD), a charged injection device (CID), a video camera, a photo multiplier tube or a human eye (in which case the light detector preferably includes an ocular eyepiece for the eye). If desired, it is possible to use a plurality of different light detectors either in series or in an adjacent relationship or in any other desired relationship. In preferred embodiments, the light detector is a CCD or a CID or other light detector that comprises as array of individual detection pixels, which indicates a plurality of spots, typically on the same order of the same side as the pixels in the spatial light modulator.

In preferred embodiments, the detection array of individual detection pixels in light detector 26 corresponds to and is aligned with the illumination array of individual light transmission pixels in the spatial light modulator. Accordingly, the detection array has an equivalent number of pixels, each of which is aligned with the pixels of the spatial light modulator array, or groups of such pixels are aligned with each other. In certain embodiments, this alignment can be effected by using a single digital micromirror device at a desired conjugate image plane in both the illumination light path and the detection light path, for example as depicted in FIG. 3.

Because digital micromirror device 34 is located at a conjugate image plane of the sample, it is capable of controlling both the quantity of light and the location of light that reaches the sample. Thus, if desired, it is possible to illuminate a single pixel of the digital micromirror device, which in turn will illuminate a single corresponding pixel of the sample, and then simultaneously detect that same pixel of the sample and pass the information from that pixel to the light detector 26.

Figure 5A:
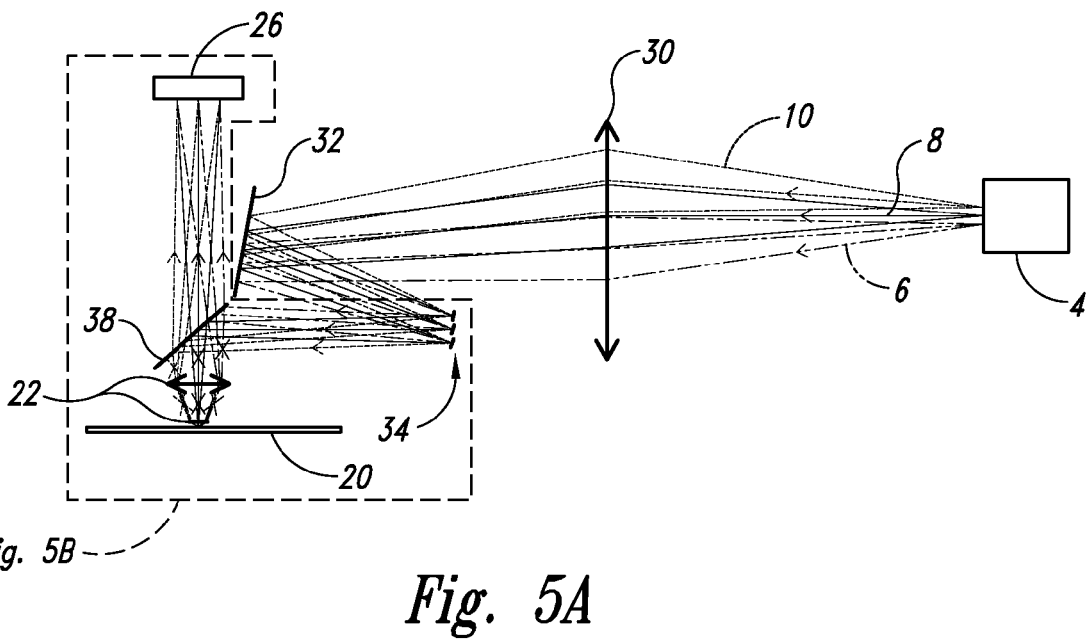
FIG. 5 provides a schematic view and an expanded schematic view of a further embodiment of a microscope according to the present invention in which a spatial light modulator is positioned upstream of, or before, a dichroic mirror.
Figure 5B:
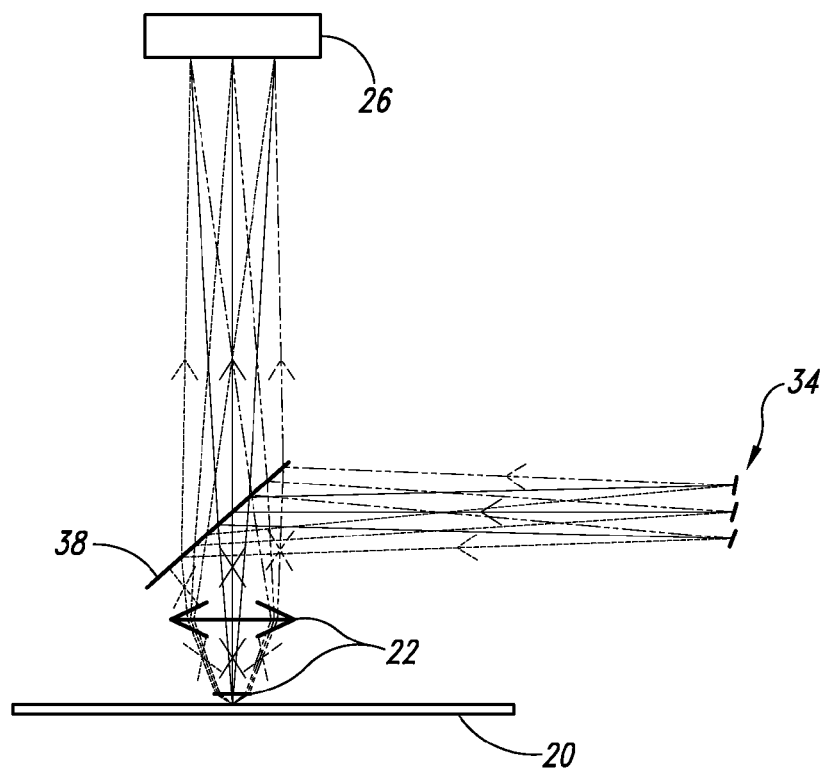

FIG. 3 depicts a reflectance microscope, which means that the light reflects off of the sample, but it could also represent a transmission microscope, which would mean the light would transmit through the sample if, a separate second spatial light modulator were used in the detection light path (or if appropriate mirrors or other devices were to direct the detection light path back to a single digital micromirror device). FIG. 5 depicts a schematic view of a microscope that is similar to the microscope set forth in FIG. 3, except that the spatial light modulator is disposed solely in the illumination light path and not in the detection light path.

Figure 7A:
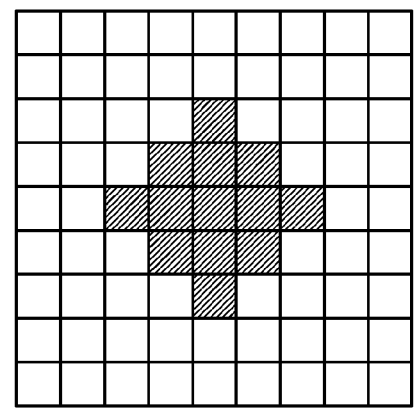
FIG. 7A provides a schematic view of a spatial light modulator in which multiple adjacent pixels are switched "on" to define an illumination spot of a desired size.
Figure 7B:
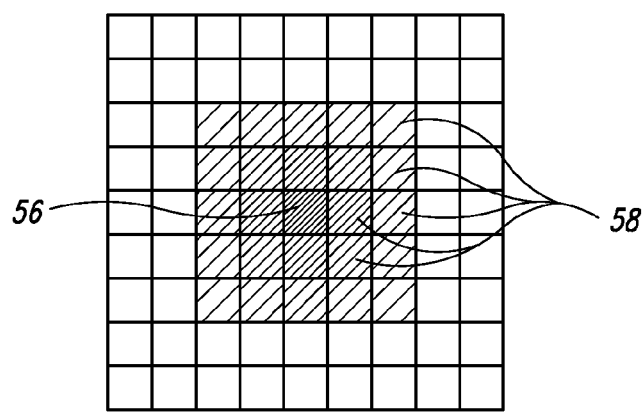
FIG. 7B provides a schematic view of a spatial light modulator in which multiple adjacent pixels are rapidly switched on and off such that when time averaged the mirrors are partially on or partially off to define a Gaussian profile illumination spot.

Preferably, the pattern(s) in the spatial light modulator(s) is effected via operably connecting the spatial light modulator to a controller, preferably a PC computer, that individually controls each of the individual light transmission pixels in the array. Further preferably, the controller will control a single mirror as a single pixel, but if desired the controller can control a plurality of mirrors as a single pixel, for example, each individual light transmission pixel could be a grouping of immediately adjacent mirrors, such as set forth in FIGS. 7A and 7B. In particular, FIG. 7 schematically depicts two different embodiments for illumination comprising the use of adjacent mirrors as a single pixel. In FIG. 7a, a plurality of individual micromirrors of the spatial light modulator are turned on as a group. FIG. 7B depicts a similar illumination spot except that different micromirrors (or microshutters or other selected pixel components) have different on/off status and thus provide a Gaussian illumination profile; other illumination profiles are also possible. In one preferred embodiment, for this and other features of the present invention that relate to the active turning on and off of individual light pixels of the spatial light modulator, the cycle time of the given event is less than the time that is needed for the human eye to detect the change, typically less than about 0.3 seconds.

Microscopes such as those depicted in FIGS. 3 and 5 that comprise a spatial light modulator in a conjugate image plane of the sample that is upstream of the sample can also provide a variable field iris. As used herein, a variable field iris indicates an iris in which the illumination spot is greater than a size suitable for use for confocal microscopy. The field iris can be varied by changing a pattern in the array of the spatial light modulator that corresponds to different field iris settings. In addition, and particularly where the microscope comprises a light detector comprising a detection array of individual detection pixels, the microscope can selectively and controllably vary the on/off status of individual light transmission pixels of the spatial light modulator to vary the light intensity impinging on selected spots of the sample. Thus, not only can a 100% on or 100% off status be attained for the variable field iris, the light intensity of individual pixels can be reduced or increased as desired, similar to the pixel variance depicted in FIGS. 2C and 7B.

In one embodiment for varying the intensity of the light impinging on the selected spots that provides a uniform intensity of light across a sample, the light from light source 4 that contacts "off" pixels in the array of the spatial light modulator such as digital micromirror device 34 is transmitted to a light detector, preferably a pixelated light detector, located, for example, at the site of beam stop 37 in FIG. 3. It is preferred that the light detector receive light directly from the spatial light modulator, which means that the light does not go through, or reflect off of, the sample. Although lesser preferred, the light may go through intervening lenses, filters, etc. between the spatial light modulator and the light detector. Because beam stop 37 is preferably located at the image plane of the sample, and receives light directly from the spatial light modulator, the spatial light modulator can have all pixels turned "off" and thus all of the light from the light source will be transmitted to the detector located at beam stop 37. The detector can then differentiate different levels of intensity within the light emanating from the light source 4, and then correct for the varying intensities via rapid alternating between on and off status to provide a uniform light to sample 20 (the light detector disposed at beam stop 37 could also be disposed in a conjugate image plane of the sample, if desired). Such rapid alternation can be effected by a controller that selectively varies the on/off status of individual light transmission pixels of the spatial light modulator to compensate for non-uniform light intensities detected corresponding pixels by the light detector.

Similarly, the microscope can vary the intensity of light emanating from the sample to the light detector by varying the intensity of light transmitted to the sample, because there is typically a direct relationship (further typically an about 1:1 relationship) between the intensity of light emitted by a sample and the intensity of light impinging on the sample. Such a microscope can be particularly useful where the light intensity impinging on a particular pixel of the light detector is greater than or equal to a threshold level that indicates that the light intensity is significantly adversely affecting adjacent pixels (for example, through spill over of the light or inability of the light detector, such as a human eye, to adjust for such over-intensity). Once the detector, and typically the controller operably connected to the detector, determines that the light impinging upon a particular pixel of the light detector has surpassed the threshold level then the detector and controller vary the on/off status of the corresponding pixels in the illumination array to reduce the intensity of light that is being transmitted to the pixel of the sample that corresponds to the over-bright pixel of the detection array until the intensity of light reaching the pixel of the detection array is reduced below the threshold level.

In a related embodiment, the light detector and controller can determine the light intensity characteristics of a sample by detecting the intensity of the light impinging on the detectors, then modifying the on/off status of the corresponding pixels in the illumination array until a uniform intensity of light is transmitted to the pixels of the detector array, and then determining the light intensity characteristics of the sample by determining the amount of time that individual pixels in the illumination light array in the spatial light modulator are on or off.

In a further embodiment, the microscope can further function as a confocal microscope, as discussed above, and the illumination array of individual light transmission pixels in the spatial light modulator that is disposed upstream from the sample in a conjugate image plane of the sample to provide at least one illumination spot that is sized for confocal microscopy by causing at least one individual light transmission pixel of the spatial light modulator to be on while adjacent pixels are off. The detection array then selectively detects the illumination spot. In a preferred embodiment, the spatial light modulator simultaneously forms a plurality of illumination spots and then provides sequential complementary patterns of the spots, as depicted in FIG. 4. In particular, as shown in the figure, on mirrors 52 are depicted as black squares in an array, while off mirrors 54 are depicted as white squares in the array. By sequentially providing a series of complementary patterns, wherein in essence the same pattern is repeated but moved one pixel to the right over the course of time, it is possible to provide a confocal image of the entire sample in about 18 on/off cycles. Such confocal microscopy can be detected using a pixelated detector such as a CCD or CID, or, if the cycle time is rapid enough that a single pixel illuminated then re-illuminated faster than the image acquisition time period on a video camera or for the human eye (or other detector's image acquisition time period), then real time confocal microscopy can be observed.

Figure 6:
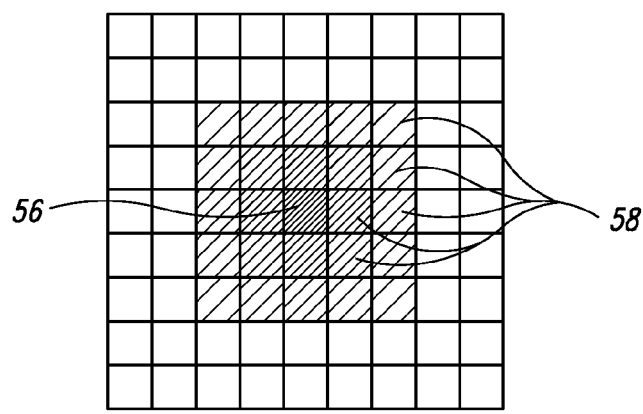
FIG. 6 provides a schematic view of an area of a pixelated light detector for use in the present invention showing an example of the area of the detector illuminated by one of the mirrors of the spatial light modulator.

FIG. 6 schematically depicts an embodiment wherein the central detection pixel 56 is more heavily illuminated than adjacent or surrounding pixels 58, but due to the characteristics of the sample the surrounding pixels are, in fact, illuminated even though only central pixel 56 was directly aligned with the on illumination pixel in the illumination array of the spatial light modulator. Thus, in an embodiment that is particularly useful for confocal microscopy but an be used in other embodiments too, the microscope comprises a controller that contains computer implemented programming that causes the light detector to detect light impinging on a central detection pixel that is aligned with an individual light transmission pixel of the spatial light modulator in the illumination light path that is on and also to detect light impinging on at least one pixel adjacent to the central detection pixel, and preferably all adjacent pixels, the controller also contains computer-implemented programming that compiles the data provided by the adjacent detection pixel(s) and combines it with the data provided by the central detection pixel to enhance the information provided to and by the microscope. For example, such combining of the data can enhance the rejection of the out-of-focus information of the microscope when such rejection is compared to the focus that is attained without the data from the adjacent detector(s). Alternatively, the information from the adjacent pixels can provide data about the light scattering and/or absorption or other characteristics of the sample. Alternatively, if desired, the detector can be set such that the detector and/or controller does not detect information from the central detector pixel that directly corresponds to the on illumination pixel but rather only collects information from the adjacent pixel(s).

In yet another embodiment, a spatial light modulator can be disposed in a conjugate image plane of the sample that is upstream of the sample, and the on/off status of the individual light transmission pixels of the illumination array can be set to project a selected image into the image plane (and therefore the conjugate image planes of the sample of the microscope. Preferably, the spatial light modulator is operably connected to at least one controller that sets and/or varies the on/off status of the individual light transmission pixels to correspond to an image that is separately being transmitted to the controller, or that is preset and contained within the memory of the controller.

The selected image can be projected directly onto the sample, or the selected image can be projected adjacent to the sample. For example, where the microscope is being used to determine whether a given sample matches a desired, predetermined state, then an image representing such predetermined state can be projected either onto the sample or adjacent to the sample; directly projecting the image onto the sample can provide a stencil effect that, for very precisely predetermined shapes, can make is relatively easy to determine whether the shape in the sample does or does not match the predetermined shape. Microscopes that project such a selected image can either comprise a single spatial light modulator for projecting the selected image while the sample is illuminated without use of a spatial light modulator, or two spatial light modulators where one is for the selected image and one is for the transmission of light directly to the sample, or a single spatial light modulator with different portions of the spatial light modulator dedicated to the different functions described herein (e.g., one portion for sample illumination and one portion for selected image projector).

Figures 8A, 8B:
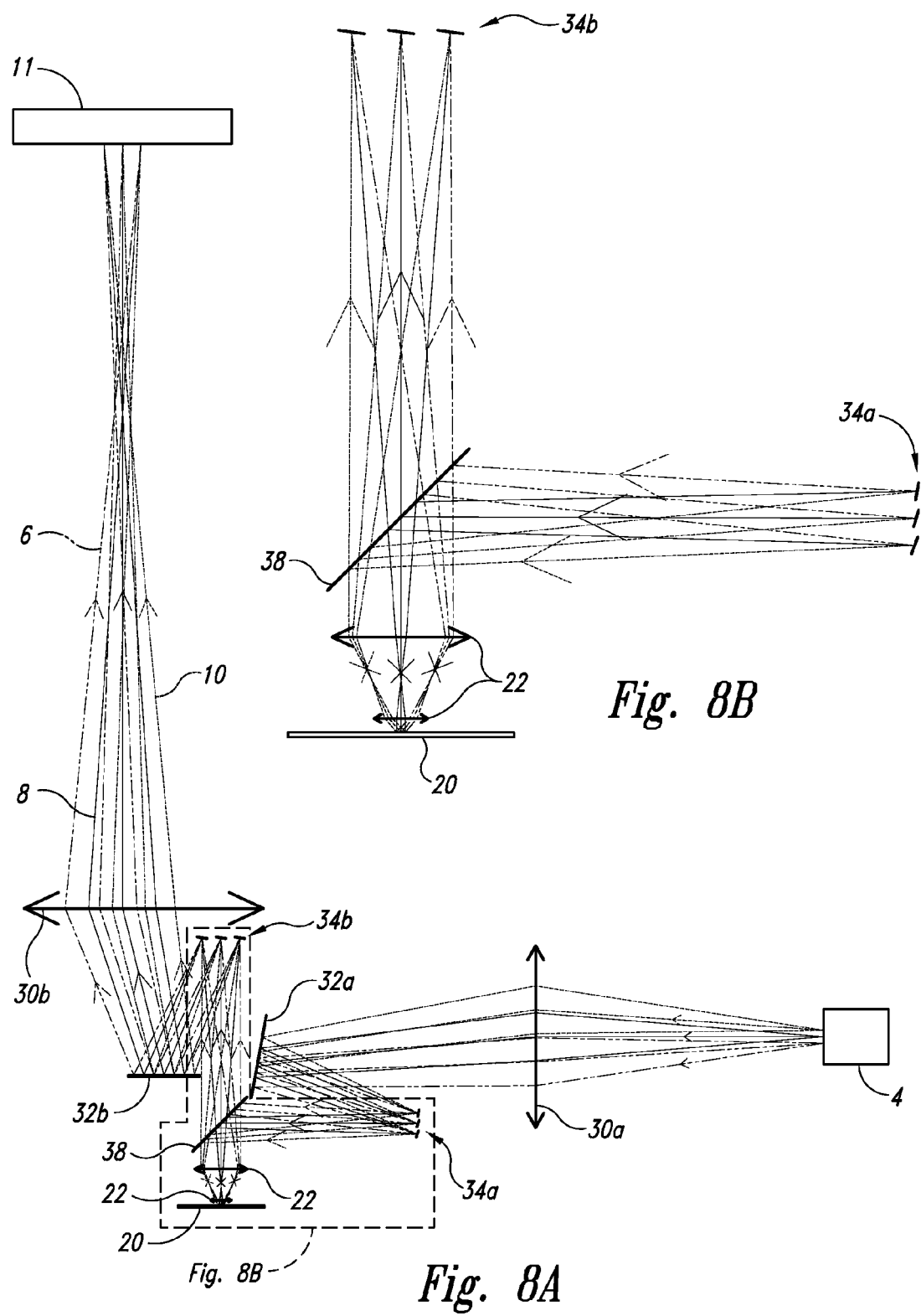
FIG. 8 provides a schematic view of a microscope according to another embodiment of the present invention that uses two spatial light modulators.

FIG. 8 depicts one example of a microscope suitable for confocal microscopy. The microscope is similar to microscopes depicted in FIGS. 3 and 5 (which microscopes could also be used for confocal microscopy), except that the microscope in FIG. 8 comprises a first digital micromirror device in a conjugate image plane of the sample that is upstream from the sample and a second, separate digital micromirror device 34*b* that is located in a conjugate image plane of the sample that is disposed downstream from the sample. Thus, in FIG. 8, light is emitted by light source 4 through projection lens 30*a* to reflect off simple mirror 32*a* and then spatial light modulator 34*a*. Light that is transmitted along the illumination light path by the spatial light modulator 34*a* is then reflected off dichroic mirror 38, through objective lenses 22 onto sample 20, where the light is reflected back through objective lenses 22, then through dichroic mirror 38 and onto downstream spatial light modulator 34*b*. Light that is passed by spatial light modulator 34*b* continues along the detection path to simple mirror 32*b*, then through projection lens 30*b* to light detector 26. One advantage of the microscope depicted in FIG. 8 is that, because there are two separate spatial light modulators, the two spatial light modulators need not have identical on/off status for the light transmission pixels therein. The embodiment in FIG. 8 is also preferred where the detector is an ocular eyepiece, photomultiplier tube (PMT), video camera, or other non-pixelated device. In addition, the detection aperture in the downstream spatial light modulator in the detection light path can be dynamically varied in the same manner as described earlier for spatial light modulators disposed in the illumination light path.

Figure 9:
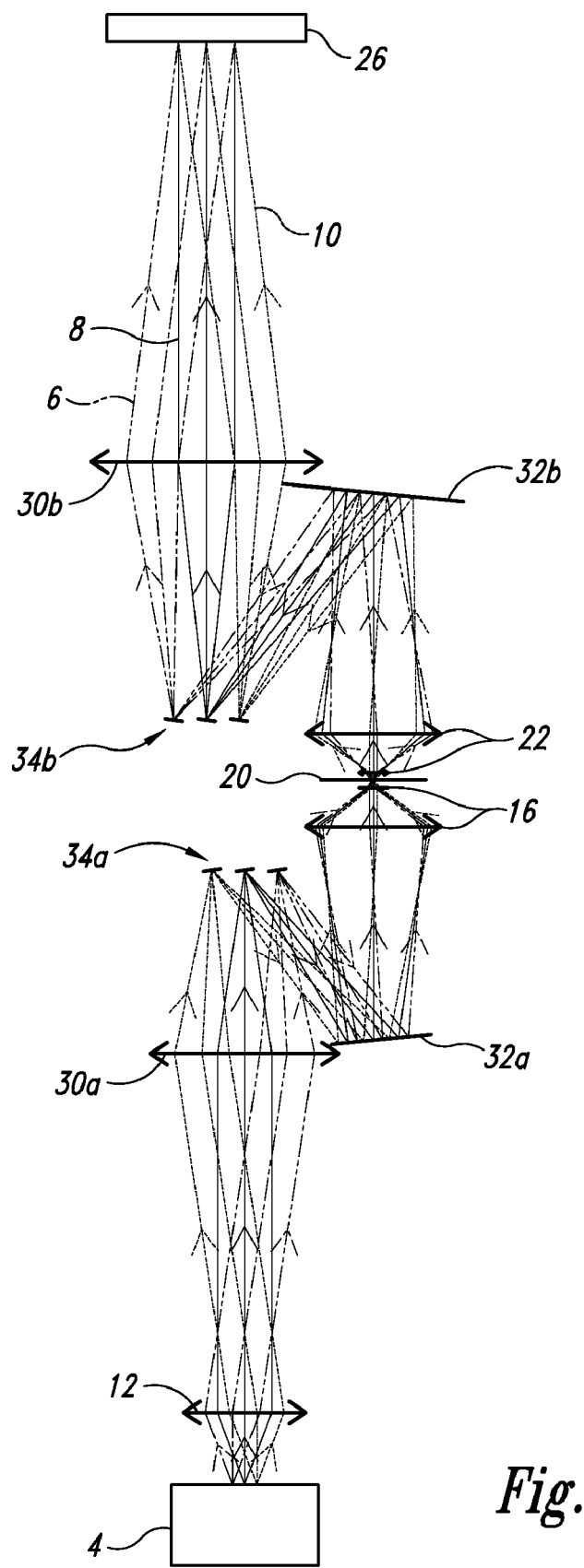
FIG. 9 provides a schematic view of a microscope according to a still further embodiment set up for Kohler illumination in which spatial light modulator replace the condenser aperture and objective aperture diaphragms in their conjugate image plane of the sample.

Turning to FIG. 9, the figure depicts a microscope wherein a first spatial light modulator is disposed in the conjugate image plane of the aperture diaphragm of the objective lens and upstream of the sample, and a second spatial light modulator is disposed downstream of the sample, also in the conjugate image plane of the aperture diaphragm of the objective lens. Briefly, light source 4 emits light through light source lens 12 along illumination path 3, through projection lens 30*a* and onto digital micromirror device 34*a*. Digital micromirror device 34*a* then selectively transmits a desired portion of the light along the illumination light path to reflect off simple mirror 32*a*, pass through condenser lenses 16, and then through sample 20. Light emanating from sample 20 passes through objective lenses 22, reflects off simple mirror 32*b* and is transmitted onto digital micromirror device 34*b*. Digital micromirror 34*b* then transmits a selected portion of the light along detection light path 5 through projection lens 30*b* and onto light detector 26. The provision of a spatial light modulator upstream from the sample in a conjugate image plane of the aperture diaphragm of the objective lens provides the ability to control the angle of illumination of a sample, and therefore, concomitantly, the angle of detection of light emanating from the sample. In addition, such a microscope can selectively control the quantity of light reaching a sample, which quantity (as with the spatial light modulator disposed in the conjugate image plane of the sample) will be less than the amount of light merely as an artifact due to transmitting through lenses, filters, etc. In some embodiments, the quantity of light can reduced anywhere from 1% to 99%. This reduction in the quantity of light can be achieved by selecting the desired quantity of illumination and then turning a corresponding selected portion of the individual light transmission pixels on or off. Such selected portion is at least substantially less than all the illumination light, enough to achieve a measurable diminution of illumination relative to the total illumination light.

Microscopes having a spatial light modulator at a conjugate image plane at the aperture diaphragm of the objective lens, such as that depicted in FIG. 9, can provide for darkfield microscopy, brightfield microscopy, and alternations between the two, as well as alternations between varieties of darkfield microscopy as different areas of the spatial light modulator are turned on and off.

This can be done by selecting a desired pattern for the darkfield microscopy in the individual light transmission pixels of the upstream spatial light modulator. Such desired pattern comprises a selected portion of the individual light transmission pixels, which portion is substantially less than all of such pixels; it will be reduced enough so that a measurable darkfield effect is achieved relative to brightfield (brightfield being wide area illumination and detection of that same area). In some embodiments, the microscope provides a primarily, or even a solely, darkfield effect. A complementary pattern will then be placed in the detection light path, preferably via use of a second digital micromirror device that comprises the complementary pattern in its pixelated array. The complementary pattern is the complement to the desired pattern set in the spatial light modulator in the illumination light path. For example, if the desired pattern is a plurality of concentric circles, then the complementary pattern would be a corresponding pattern of concentric circles, except that the complementary pattern would be light blocking in the concentric circles that are light transmissive in the desired pattern.

Additionally, the change in angle of illumination made possible by such microscopes permit the determination of 3-D images of the sample. For example, the sample can be illuminated from a plurality of different angles, and then the changes in intensity in the light impinging on individual pixels in the detection array can be detected and then combined, compiled and/or reconstructed by a controller to provide a 3-D image of the sample. In addition, or alternatively, the angles of light can be modulated to select a plurality of different angles of illumination that probe the sample at different depths. The information obtained from the different depths can then be obtained and tomographically reconstructed, typically by the controller, to provide a 3-D image of the sample, one layer at a time. It is a significant advantage of the present invention that such 3-D imaging can be effected without moving the sample, a condensor lens or an objective lens, or any other part of the microscope other than the spatial light modulator.

This is similar to the ability of microscopes having a spatial light modulator at the conjugate image plane of the objective lens aperture diaphragm to perform a variety of darkfield examinations, as well as alternation between darkfield and brightfield, without moving the sample, condenser lenses, objective lenses or other parts of the microscope other than the light transmission pixels of the spatial light modulator. Thus, such alterations can be performed without refocusing. Another advantage of the rapid alternation between darkfield and brightfield microscopy particularly with microscopes having a spatial light modulator at the conjugate image plane of the aperture diaphragm of the objective lens, is that light that is scattered and/or refracted by the sample, which is usually not correctly accounted for during the quantitative measurement process in quantitative brightfield microscopy, can be measured at each location in the sample. This allows for a more accurate quantitation of the amount of light lost by absorption. This can be particularly important when attempting to quantitate the total amount of light that is absorbed over given areas of the sample and will provide a more precise spatial absorption representation of the sample.

Typically when creating 3-D images as described herein, the signal-to-noise ratio of the images required for different illumination angles is high enough that the reconstruction does not become unstable and converge. Depending on the thickness of the 3-D sample being analyzed, more or less out-of-focus information is included in each image. If the sample is too thick with respect to the approximate in-focus depth of the objective being used, then the out-of-focus information can overwhelm the in-focus information, making reconstruction difficult, or even impossible.

Figure 10A:
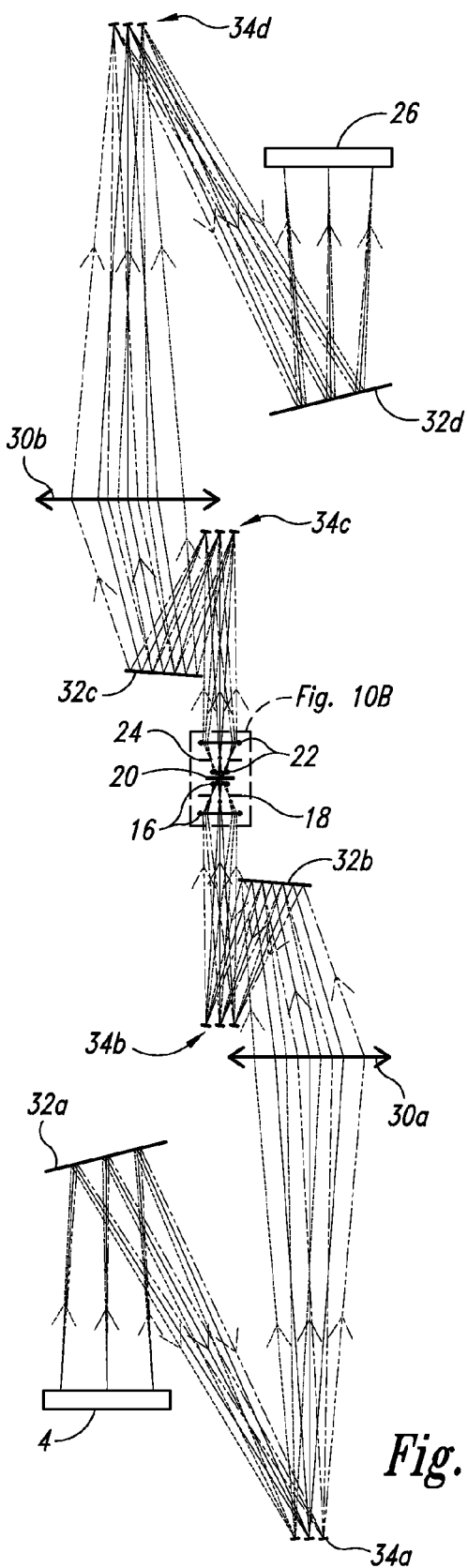
FIG. 10 is a schematic view and an expanded schematic view of a microscope according to still another embodiment of the invention that comprises four digital micromirror devices to control the light transmission characteristics of the conjugate image plane of the sample and the conjugate image plane of the aperture diaphragm of the objective lens.
Figure 10B:
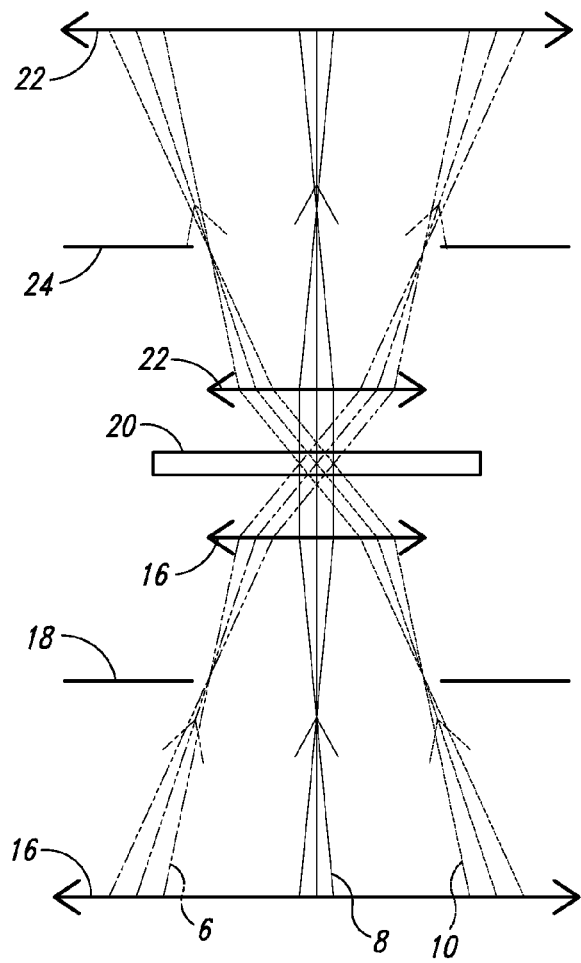

FIG. 10 schematically depicts one embodiment of a microscope that resolves this problem. Briefly, FIG. 10 comprises four spatial light modulators, two in the illumination light path and two in the detection light path, one in each light path located in the conjugate image plane of the sample and one in each light path located in the conjugate image plane of the aperture diaphragm of the objective lens. Accordingly, in the figure, light source 4 emits light to simple mirror 32a, which reflects light to a first spatial light modulator 34a, which is located in an upstream conjugate image plane of the aperture diaphragm of the objective lens. Spatial light modulator 34a transmits a desired portion of light along illumination light path 3 to projection lens 30a, after which it is reflected off simple mirror 32b and transmitted to a second spatial light modulator 34b, which spatial light modulator is located in an upstream conjugate image plane of the sample. The second spatial light modulator 34b then transmits desired light through condenser lenses 16 to sample 20, where the light is transmitted through the sample, through objective lenses 22 and onto a third spatial light modulator 34c, which is located in a downstream conjugate image plane of the sample. Light that is desired to be transmitted to the light detector 26 is then transmitted by the third spatial light modulator 34c to simple mirror 32c where it is reflected through projection lens 30b and onto a fourth spatial light modulator 34d, which modulator is located in a downstream conjugate image plane of the aperture diaphragm of the objective lens. The fourth spatial light modulator then transmits desired light to simple mirror 32d which reflects the light to light detector 26.

Because of the combination of spatial light modulators in both the conjugate image plane of the sample and the conjugate image plane of the aperture diaphragm of the objective lens, it is possible to selectively combine all of the features discussed above for spatial light modulators located in one or another of the planes. For example, combining confocal microscopy with illumination at a variety of angles provides for 3-D confocal transmission and reflectance microscopy. Further, because of the rapid switching time that is possible using the spatial light modulators, it is possible to see such 3-D confocal image in real time. Additionally, due to the ability to calculate, and account for, out-of-focus information as discussed above, such information can be limited and controlled, thereby simplifying the reconstruction task in the making of the 3-D image.

Figure 11:
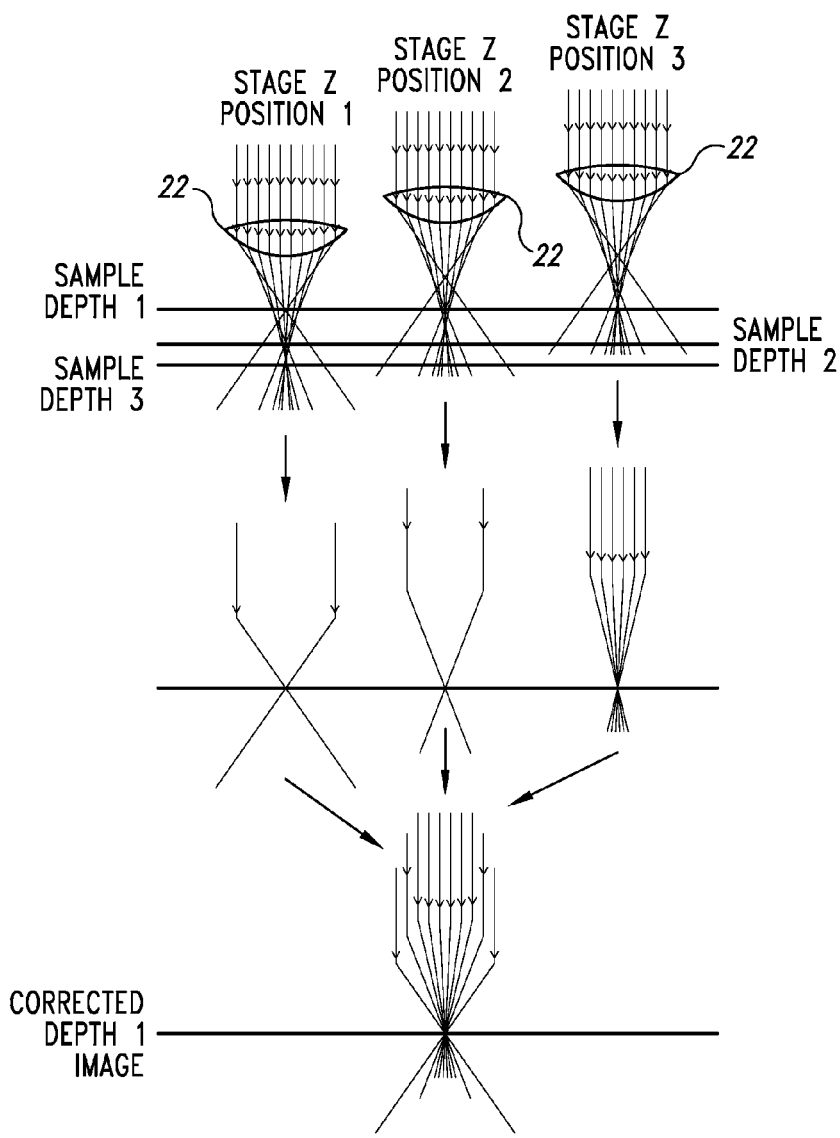
FIG. 11 illustrates one manner in which a microscope of the present invention can be used to correct for spherical aberration effects of a lens by images of the sample at a plurality of different depths with the sample using selected illuminating and detection orientations from selected z positions and combining the images into a composite image.

The addition of appropriate filters will also allow for the process to be used for controlled confocal fluorescence imaging (indeed, all embodiments of the present invention can be used for fluorescence microscopy). Another advantage of combining spatial light modulators in both planes is that it is possible to correct for some spherical aberrational effects by acquiring images of the sample using selected illumination and detection orientations from selected z positions of the sample, as illustrated in FIG. 11. In FIG. 11, the upper portion of the figure depicts the taking of three images of a sample at three different depths, followed, in the middle portion of the figure, by selecting the light rays of each portion that converge at a particular desired depth (equivalent to the second sample depth in the upper portion of the figure), which is then followed by the combining of the desired angles of illumination at all three sample depths as schematically represented in the lower portion of FIG. 11.

Figure 12:
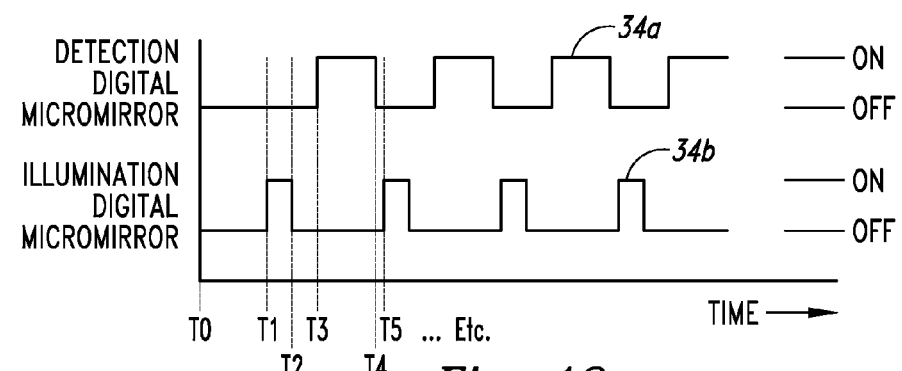
FIG. 12 is a timing diagram showing a manner in which the on/off status of a pair of spatial light modulators can be coordinated to perform time delayed fluorescence microscopy.

Another advantage of the present invention is that it permits easily performed time-delayed fluorescence microscopy. This can be accomplished by turning on desired illumination pixels in the spatial light modulators in the illumination light path and then turning off corresponding pixels in the spatial light modulators (or detector) in the detection light path. After enough time has passed to induce fluorescence in the sample, which fluorescence can be autofluorescence or fluorescence due to materials, such as dyes, added to the sample, the spatial light modulators in the illumination light path are turned off and a short time later the detection pixels of the detector, or the light transmission pixels of spatial light modulators disposed in the detection light path, are turned on. One example of the timing for such a situation is depicted in FIG. 12. Briefly, the illumination spatial light modulator 34b is turned on for a short, defined time, $t_0$-$t_1$, and then a short time later the detection spatial light modulator is turned on for a defined time, $t_2$-$t_3$, after which time is the illumination spatial light modulator 34b is again turned on. Such microscopy can be performed both in confocal and wide field modes.

Figure 13A:
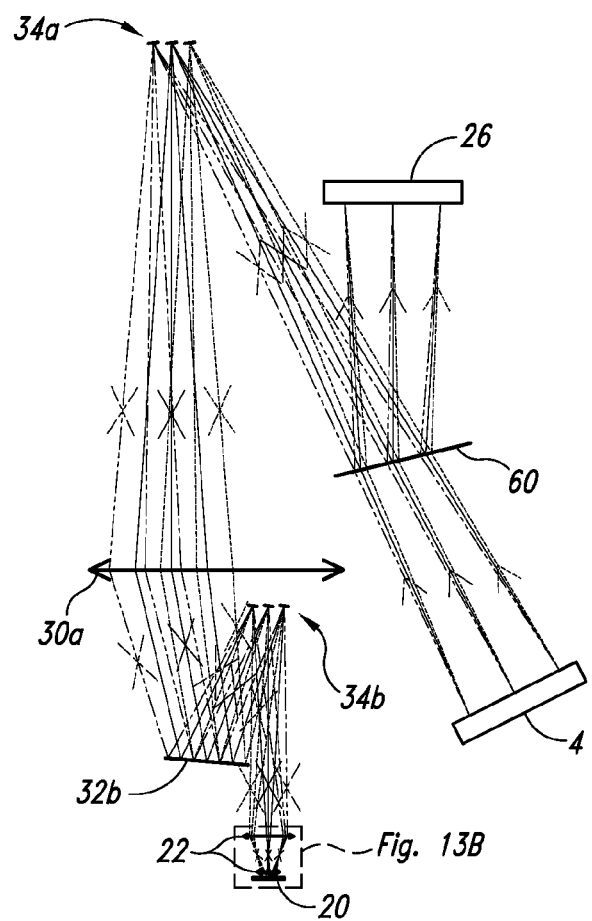
FIG. 13 depicts a schematic view and an expanded schematic view of a microscope according to a further embodiment of the present invention wherein the microscope is similar to the microscope in FIG. 10, except the microscope is used for reflectance microscopy, and two spatial light modulators provide spatial light modulation in each of the illumination light path and the detection light path, thereby functionally providing four spatial light modulators in the light path.
Figure 13B:
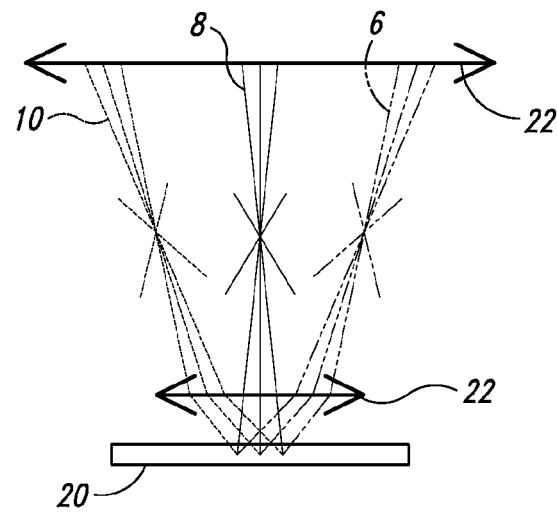

FIG. 13 schematically depicts an arrangement of lenses, mirrors and spatial light modulators similar to the microscope set forth in FIG. 10, except that the microscope in FIG. 13 is suitable for reflectance microscopy instead of transmission microscopy. In FIG. 13, light source 4 emits light through a beam splitter 60 to a digital micromirror device 34a. The beam splitter 60 can be a dichroic mirror or other type of beam splitter, beam splitters other than dichroic mirrors can also be used with other embodiments of the present invention. Desired light is then reflected along the illumination light path 3 through projection lens 30 to reflect off simple mirror 32 onto a second digital micromirror device 34b. Desired light is then transmitted by digital micromirror device 34b through objective lenses 22 and onto sample 20, where the light is reflected back through objective lenses 22, off digital micromirror device 34b and simple mirror 32, through projection lens 30 and off first digital micromirror device 34a. Desired light is then transmitted back along the light path until it contacts dichroic mirror 38, where it is reflected to light detector 26. Thus, the microscope depicted in FIG. 13 provides for illumination of a single spot or pattern of spots as previously described, and for each spot or pattern of spots a variety of illumination angles can be sequentially implemented, and for each angle an image or measurement is collected. Thus, all areas of the plane of the sample surface can be collected. One can then change the position of the sample along the optical axis of the microscope and repeat the process for the new level of the sample. Thus, information from the entire surface of interest can be collected and tomographically reconstructed to generate a 3-D representation of the surface of the sample. The microscopes herein are this is advantageous over conventional, reflectance microscopy because the surface orientation of every location of the sample can be determined in a relatively straightforward fashion.

Figure 14:
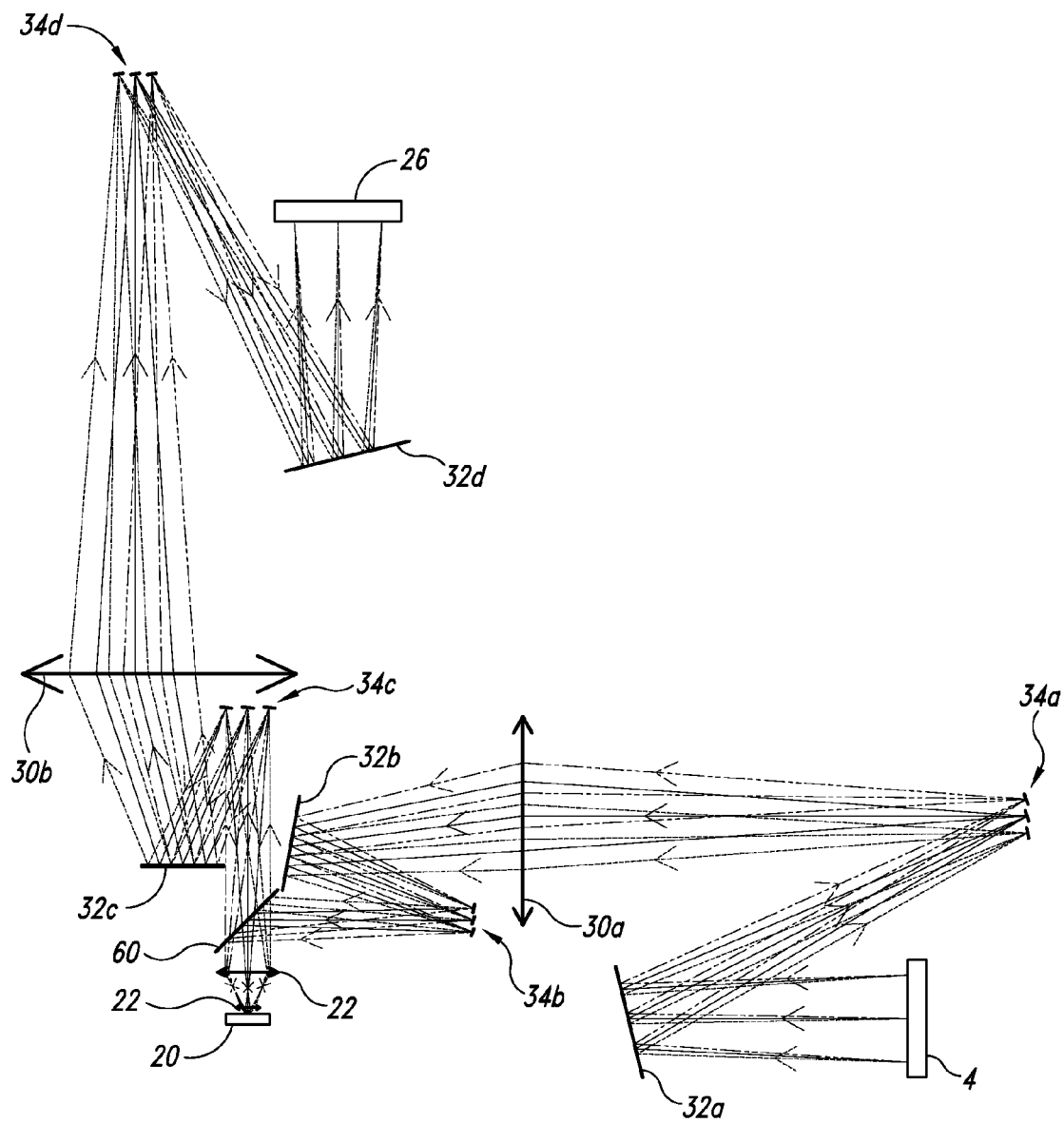
FIG. 14 depicts a schematic view of a microscope according to a further embodiment of the present invention wherein the microscope is similar to the microscopes set forth in FIGS. 10 and 13, wherein the microscope is used for reflectance microscopy and a total of four spatial light modulators are interspersed in the illumination light path and the detection light path.

FIG. 14 schematically depicts another embodiment of a microscope that is similar to the microscopes in FIGS. 10 and 13 and comprises four spatial light modulators, two in the illumination light path and two in the detection light path, one in each light path located in the conjugate image plane of the sample and one in each light path located in the conjugate image plane of the aperture diaphragm of the objective lens. The microscope in FIG. 10 is used for reflectance microscopy and comprises a beam splitter 60 disposed between the digital mirror devices 34b, 34c and the objective lenses 22.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A microscope that provides a uniform intensity of illumination light to a sample, the microscope comprising a spatial light modulator comprising an illumination array of individual light transmission pixels and disposed in an illumination light path at a conjugate image plane of the sample, to provide an upstream spatial light modulator, and a light detector comprising a detection array of individual detection pixels and disposed downstream from the upstream spatial light modulator at a conjugate image plane of the sample and that receives light directly from the upstream spatial light modulator, wherein the spatial light modulator and the light detector are operably connected to at least one controller containing computer-implemented programming that controls transmissive characteristics of the upstream spatial light modulator and that compiles the light intensity detection data provided by the light detector, wherein the at least one controller selectively varies the on/off status of individual light transmission pixels of the spatial light modulator to compensate for non-uniform light intensities detected by the light detector, thereby providing a uniform intensity of illumination light that is transmitted to the sample, wherein the microscope further comprises a second spatial light modulator that is disposed in the detection light path, located at a downstream conjugate image plane of a sample and operably connected to a second modulator controller containing computer-implemented programming that controls transmissive characteristics of the second spatial light modulator, wherein the microscope is a confocal microscope, wherein the detection array of individual detection pixels corresponds to and is aligned with the illumination array of individual light transmission pixels in the upstream spatial light modulator and the at least one controller contains computer-implemented programming that controls transmissive characteristics of the upstream spatial light modulator to provide at least one illumination spot to the sample by causing at least one individual light transmission pixel of the upstream spatial light modulator to be on while adjacent pixels are off and the detection array selectively detects the illumination spot, wherein the at least one controller causes the upstream spatial light modulator to simultaneously form a plurality of the illumination spots and to provide sequential complementary patterns of the spots, and wherein the at least one controller causes the light detector to detect light impinging on a central detection pixel aligned with an individual light transmission pixel of the upstream spatial light modulator that is on and to detect light impinging on at least one detection pixel adjacent to the central detection pixel, and the controller contains computer-implemented programming that compiles the data provided by the at least one adjacent detection pixel and combines it with the data provided by the central detection pixel.

2. The microscope of claim 1 wherein the computer-implemented programming compiles the data provided by the adjacent detection pixels and combines it with the data provided by the central detection pixel such that the rejection of the out of focus information of the microscope is enhanced compared to the focus without the data from the adjacent detection pixels.

3. The microscope of claim 1 wherein the computer-implemented programming compiles the data provided by the adjacent detection pixels and combines it with the data provided by the central detection pixel to determine the light absorption characteristics of the sample.

4. A method for varying the intensity of light emanating from a sample to a light detector in a microscope, wherein the microscope comprises a spatial light modulator comprising an illumination array of individual light transmission pixels and disposed in an illumination light path at a conjugate image plane of the sample and a light detector that comprises a detection array of individual detection pixels and is disposed downstream from the sample in a detection light path at a conjugate image plane of the sample, wherein the spatial light modulator and the light detector are operably connected to at least one controller containing computer-implemented programming that controls transmissive characteristics of the spatial light modulator and that compiles the light intensity detection data provided by the light detector, the method comprising:

varying an on/off status of individual light transmission pixels of the spatial light modulator to vary the light intensity impinging on selected spots of the sample and thereby varying the intensity of light emanating from the selected spots of the sample and impinging on at least one pixel of the light detector, wherein the method further comprises selectively varying the on/off status of individual light transmission pixels of the spatial light modulator such that when the light intensity impinging on a pixel of the light detector is greater than or equal to a threshold level that indicates that the light intensity significantly adversely affects adjacent pixels then turning off at least one corresponding pixel in the spatial light modulator for a time sufficient to reduce the light intensity impinging on the pixel of the light detector below the threshold level.

5. The method of claim 4 wherein the method further comprises selectively varying the on/off status of individual light transmission pixels of the spatial light modulator such the light intensity impinging on the detection array of pixels of the light detector is uniform across the detection array, and determining the light intensity characteristics of the sample by determining an amount of time individual pixels in the illumination array of the upstream spatial light modulator are on or off.

6. A method for varying the intensity of light emanating from a sample to a light detector in a microscope, wherein the microscope comprises a spatial light modulator comprising an illumination array of individual light transmission pixels and disposed in an illumination light path at a conjugate image plane of the sample and a light detector that comprises a detection array of individual detection pixels and is disposed downstream from the sample in a detection light path at a conjugate image plane of the sample, wherein the spatial light modulator and the light detector are operably connected to at least one controller containing computer-implemented programming that controls transmissive characteristics of the spatial light modulator and that compiles the light intensity detection data provided by the light detector, the method comprising:

varying an on/off status of individual light transmission pixels of the spatial light modulator to vary the light intensity impinging on selected spots of the sample and thereby varying the intensity of light emanating from the selected spots of the sample and impinging on at least one pixel of the light detector, wherein the microscope is a confocal microscope, wherein the method further comprises providing at least one illumination spot to the sample by causing at least one individual light transmission pixel of the spatial light modulator to be on while adjacent pixels are off and the detection array selectively detects the illumination spot, wherein the spatial light modulator simultaneously forms a plurality of the illumination spots and provides sequential complementary patterns of the spots, and wherein the method further comprises detecting light impinging on a central detection pixel aligned with an individual light transmission pixel of the spatial light modulator that is on and detecting light impinging on at least one detection pixel adjacent to the central detection pixel, and compiling the data provided by the at least one adjacent detection pixel and combining it with the data provided by the central detection pixel.

7. The method of claim 6 wherein the method further comprises compiling the data provided by the adjacent detection pixels and combining it with the data provided by the central detection pixel such that the rejection of the out of focus information of the microscope is enhanced compared to the focus without the data from the adjacent detection pixels.

8. The method of claim 7 wherein the method further comprises compiling the data provided by the adjacent detection pixels and combining it with the data provided by the central detection pixel and therefrom determining the light absorption characteristics of the sample.

9. A microscope that varies the intensity of light emanating from a sample to a light detector, the microscope comprising a spatial light modulator comprising an illumination array of individual light transmission pixels and disposed in an illumination light path at a conjugate image plane of the sample, to provide an upstream spatial light modulator, and the light detector which comprises a detection array of individual detection pixels and is disposed downstream from the sample in a detection light path at a conjugate image plane of the sample, wherein the spatial light modulator and the light detector are operably connected to at least one controller containing computer-implemented programming that controls transmissive characteristics of the upstream spatial light modulator and that compiles the light intensity detection data provided by the light detector, wherein the controller selectively varies the on/off status of individual light transmission pixels of the spatial light modulator to vary the light intensity impinging on selected spots of the sample and thereby vary the intensity of light emanating from the selected spots of the sample and impinging on at least one pixel of the light detector, wherein the microscope further comprises a second spatial light modulator that is disposed in the detection light path, located at a downstream conjugate image plane of a sample and operably connected to a second modulator controller containing computer-implemented programming that controls transmissive characteristics of the second spatial light modulator, wherein the microscope is a confocal microscope, wherein the detection array of individual detection pixels corresponds to and is aligned with the illumination array of individual light transmission pixels in the upstream spatial light modulator and the at least one controller contains computer-implemented programming that controls transmissive characteristics of the upstream spatial light modulator to provide at least one illumination spot to the sample by causing at least one individual light transmission pixel of the upstream spatial light modulator to be on while adjacent pixels are off and the detection array selectively detects the illumination spot, wherein the at least one controller causes the upstream spatial light modulator to simultaneously form a plurality of the illumination spots and to provide sequential complementary patterns of the spots, and wherein the at least one controller causes the light detector to detect light impinging on a central detection pixel aligned with an individual light transmission pixel of the upstream spatial light modulator that is on and to detect light impinging on at least one detection pixel adjacent to the central detection pixel, and the controller contains computer-implemented programming that compiles the data provided by the at least one adjacent detection pixel and combines it with the data provided by the central detection pixel.

* * * * *